(12) United States Patent
Tanninen et al.

(10) Patent No.: US 11,341,409 B2
(45) Date of Patent: May 24, 2022

(54) SYSTEMS AND METHODS FOR ERROR REDUCTION IN MATERIALS CASTING

(71) Applicant: ELEMENT AI INC., Montréal (CA)

(72) Inventors: Petri Juhani Tanninen, Montreal (CA); Hamed Shal Zoghi, Montreal (CA); Patrick Steeves, Montreal (CA); Charles Hooper, Montreal (CA); Anna Dlubak, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 126 days.

(21) Appl. No.: 16/691,810

(22) Filed: Nov. 22, 2019

(65) Prior Publication Data

US 2020/0167649 A1 May 28, 2020

Related U.S. Application Data

(60) Provisional application No. 62/772,312, filed on Nov. 28, 2018.

(51) Int. Cl.
| | |
|---|---|
| *G06N 3/08* | (2006.01) |
| *G06K 9/62* | (2022.01) |
| *G05B 13/02* | (2006.01) |
| *B33Y 50/02* | (2015.01) |
| *B22C 9/04* | (2006.01) |
| *G05B 19/4099* | (2006.01) |

(52) U.S. Cl.
CPC .............. *G06N 3/08* (2013.01); *B22C 9/04* (2013.01); *B33Y 50/02* (2014.12); *G05B 13/027* (2013.01); *G05B 19/4099* (2013.01); *G06K 9/6256* (2013.01); *G05B 2219/32335* (2013.01); *G05B 2219/35134* (2013.01)

(58) Field of Classification Search
CPC . G06N 3/08; B33Y 50/02; B22C 9/04; G05B 13/027; G05B 19/4099; G05B 2219/32335; G05B 2219/35134; G06K 9/6256
See application file for complete search history.

(56) References Cited

U.S. PATENT DOCUMENTS

| | | | |
|---|---|---|---|
| 2016/0274561 A1* | 9/2016 | Stone | .................... G05B 19/188 |
| 2017/0333980 A1* | 11/2017 | Yang | ......................... B22C 7/02 |
| 2017/0372480 A1* | 12/2017 | Anand | .................... G06T 19/20 |

(Continued)

*Primary Examiner* — Thomas C Lee
*Assistant Examiner* — Ameir Myers
(74) *Attorney, Agent, or Firm* — Norton Rose Fulbright Canada LLP

(57) ABSTRACT

Deep learning approaches and systems are described to control the process of casting physical objects. A neural network, operating on one or more processors of a server or distributed computing resources and maintained in one or more data storage devices, is trained to recognize relationships between the target digital representation and the resulting metal parts that are cast, and a number of specific approaches are described herein to overcome technical issues in relation to misalignments between reference points, among others. These deep learning approaches are then used for generation of command or control signals which modify how the casting process is conducted. Command or control signals can be used to modify how a cast mold is made, to modify environmental variables, to modify manufacturing parameters, and combinations thereof.

20 Claims, 23 Drawing Sheets

(56) References Cited

U.S. PATENT DOCUMENTS

| | | | |
|---|---|---|---|
| 2018/0015379 A1* | 1/2018 | Pratt | A63H 9/00 |
| 2018/0126601 A1* | 5/2018 | Meindl | B29C 39/44 |
| 2019/0091895 A1* | 3/2019 | Knappworst | B29C 64/171 |
| 2019/0391562 A1* | 12/2019 | Srivastava | B23Q 15/02 |
| 2020/0043186 A1* | 2/2020 | Selviah | G06T 7/33 |
| 2020/0160186 A1* | 5/2020 | Lesso | G06N 3/0481 |

* cited by examiner

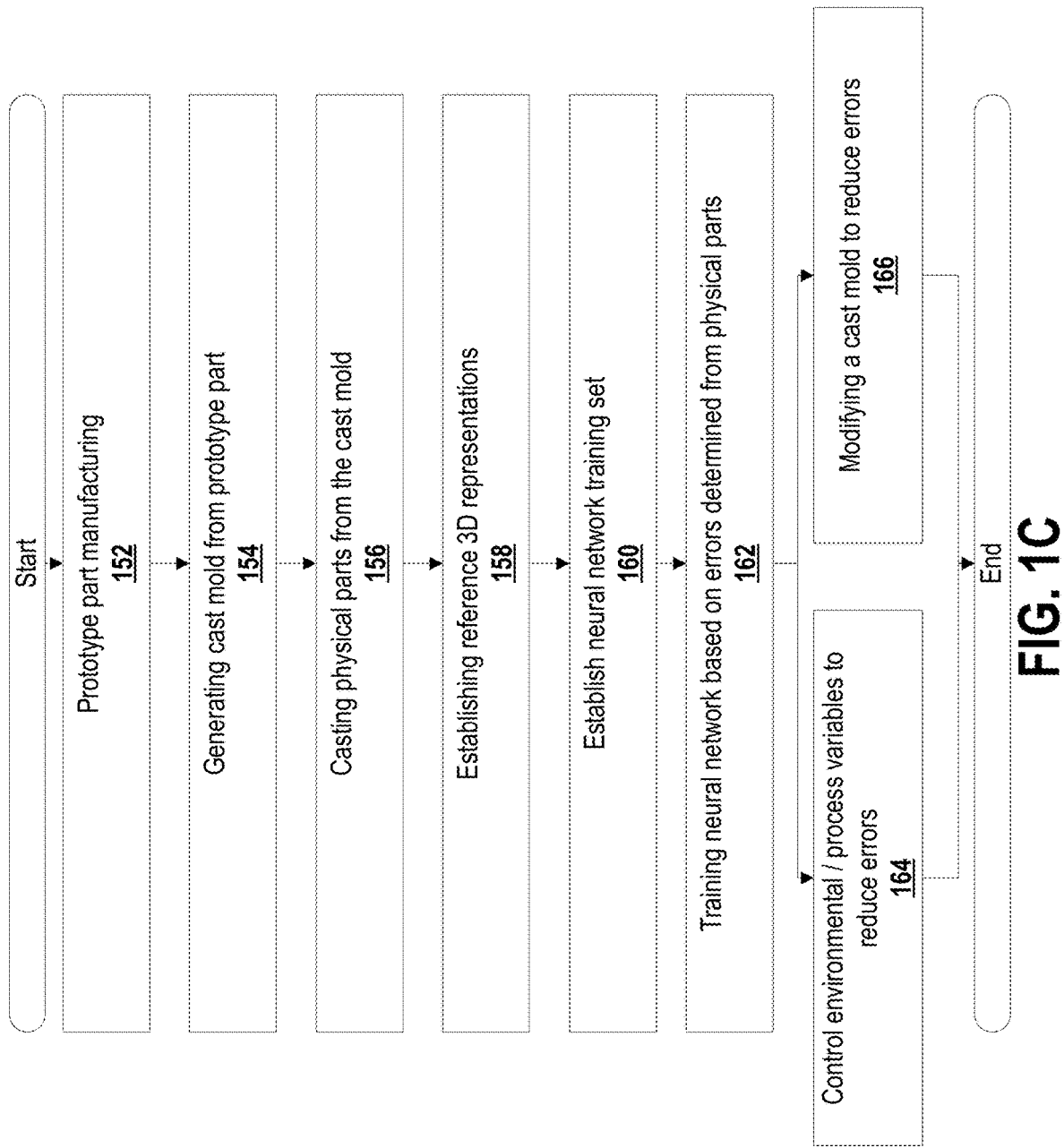

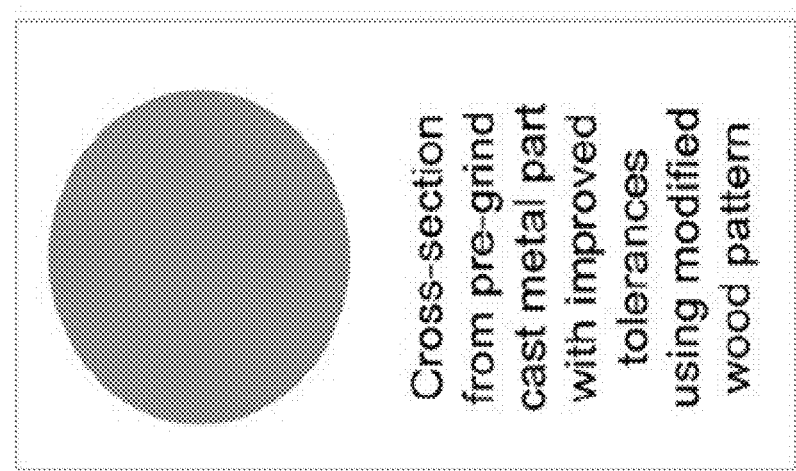
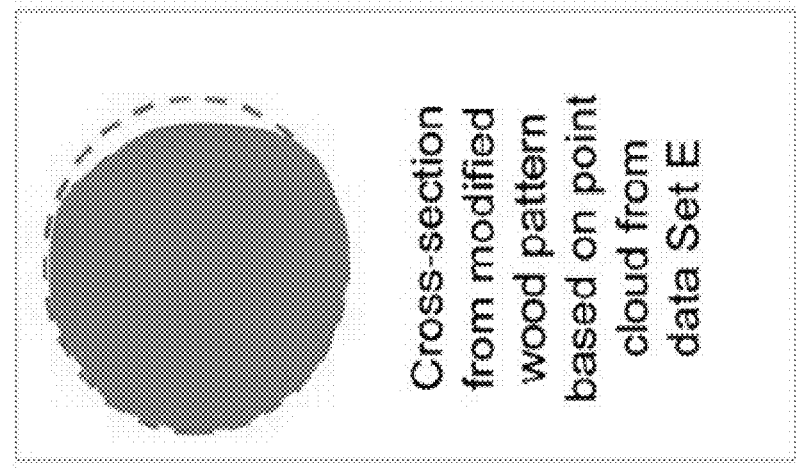
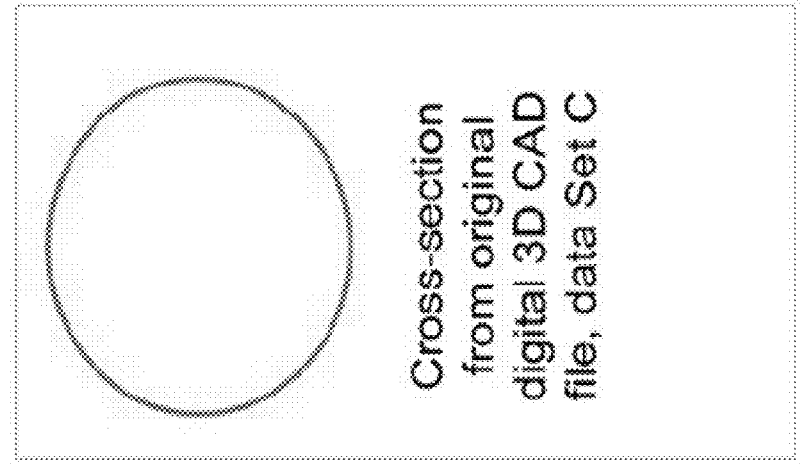
FIG. 17

SYSTEMS AND METHODS FOR ERROR REDUCTION IN MATERIALS CASTING

CROSS-REFERENCE

This application is a non-provisional of, and claims all benefit, including priority to, U.S. Application No. 62/772,312, entitled "SYSTEMS AND METHODS FOR ERROR REDUCTION IN MATERIALS CASTING", filed on Nov. 28, 2018, incorporated herein by reference in its entirety.

FIELD

The present disclosure generally relates to the field of physical materials casting, and in particular, computer-aided error reduction approaches in relation to physical materials casting.

INTRODUCTION

Casting is a useful manufacturing technique as it provides an economical way for manufacturing very complex physical metal objects.

Casting can involve the following steps: (1) pouring molten metal into a mold; (2) letting the metal cool and harden; and (3) releasing the metal from the mold. It may be desirable to have very little differences between the original part the mold is made from and the resulting metal parts that are removed from the mold.

There are different types of casting—for example, sand casting is used to produce custom metal parts and the metal parts may have complex geometry. In sand casting, sand is used as a tooling material, which forms around a positive model of a part (e.g., a CNC version of a metal part). A sand mold is formed and two halves are put together, and molten metal is poured in to take the shape of the part within an aperture in the sand mold.

Accurate casting of physical parts can involve one or more technical challenges, and grinding or other post-machining processes are typically necessary to achieve tolerances needed for various practical implementations, as errors are introduced during each stage of the casting process. In some sand-casting approaches, for example, specific allowances are utilized to account for contraction due to solidification, uneven cooling (e.g. shrinkage, cracks)/heating, etc., which introduce errors in the casting process. In sand casting, and in all types of casting, the practical tools and steps utilized in casting, such as amount of lubrication, choice of lubricant, secureness of clamping, pouring, how the casts are broken (e.g., shake-out, shot blasting), trimming, etc., further introduce errors into the casting process.

These errors are costly to remediate and often require manual effort.

SUMMARY

The example technical challenges described above can be compounded by the requirement of very tight tolerance bands for cast parts. For example, sand casting is often utilized for producing automobile components, such as engine blocks, manifolds, cylinder heads, transmission cases, etc. Variations from an ideal part lead to reduced efficiency or parts incompatibility, causing parts to be rejected for use or lead to assembly line stoppages, etc.

There are many errors that can occur during the casting process resulting in differences between the digital representation or CAD model that is used as a target for manufacture and the cast metal parts. As a result, wasted resources are spent post-processing (e.g., grinding) the part such that the to within the desired tolerance band or rejecting parts that cannot be corrected.

The defects that arise through casting metal parts can be due to errors in creating the original mold, change in volume and shape of the part as it cools and variations in sand characteristics (e.g., sand inhibitors can be added to the molding sand to avoid reactions), humidity and temperature (e.g., surface temperature measured using thermal imaging cameras, ambient environmental temperature) in the casting environment. For example, sand characteristics can be modified by process parameters, such as gassing the sand with carbon dioxide, adding boric acid, among others. Some types of metal may need to utilize different process parameters to feeding devices, risers, etc.

There are a large number of interrelated factors that cause unintentional defects, which are represented by variations from the idealized computer aided design model. There can be issues during solidification, for example, from expansion, shrinkage, oxide entrapment, chemical/physical reactions, among others. For example, magnesium is particularly difficult due to the physical properties and chemical reactivity of magnesium.

The interrelationships between the factors are difficult to model as the interrelationships are often nonlinear or not well understood. Where there are errors in manufacturing, these errors are often remediated through manual or semi-manual grinding to ensure that the parts meet the required tolerances.

Some embodiments described herein provide computer-aided solutions to the above problems, among other problems.

The solutions may include, for example, modelling, using a set of training iterations (e.g., a large enough data sample), in a neural network, interrelationships which may then be utilized to adjust the process by, for example, changing how a cast mold is shaped so that the final output part is closer the desired part, modifying a cast mold shape in view of expected deviations from an idealized casting environment, modifying a cast environment in view of reducing errors as between the ideal part and the actual part, and the trained model can be tested and validated against never-before-observed parts.

In some embodiments, the approach is directed to reducing surface errors, as opposed to volumetric errors in relation to the geometries of the cast parts, or vice versa. Where surface errors are considered only, a reduced amount of points may be considered, which reduces computational complexity.

Errors can be considered in the context of absolute error, or relative error in relation to specific desired measurements and tolerances, such as desired tolerances, dimensions, and sizes, including, for example, parallel-ness, flatness, concentricity, cylindericity), and the loss functions for the deep learning may be adjusted where a balance is needed as between the various desired measurements and tolerances. Geometry specific models for machine learning can be used to assess geometrical quality of outputs.

The improved approach of some embodiments may be considered a replacement for solidification modelling, which is a typically simulated approach. Instead of simulations, the actual cast parts, along with the mold, are measured, along with, in some embodiments, process variables and environmental variables for computer-implemented deep learning.

Deep learning approaches are utilized to modify the process of casting physical objects (e.g., metal casting). A neural network, operating on one or more processors of a server or distributed computing resources and maintained in one or more data storage devices, is trained to recognize relationships between the target digital representation and the resulting metal parts that are cast, and a number of specific approaches are described herein to overcome technical issues in relation to misalignments between reference points, among others. These deep learning approaches are then used for generation of command or control signals which modify how the casting process is conducted.

Command or control signals can be used to modify how a cast mold is made, to modify environmental variables (e.g., temperature/humidity), to modify manufacturing parameters (e.g., baking time), and combinations thereof. The signals may be in the form of electronic communications or signals, encapsulated as data packets sent through one or more networking interfaces.

Three-dimensional spatial data (e.g., point clouds, voxels, polygons) between an original computer aided design (CAD) model, a cast mold (e.g., a wooden cast in the context of sand casting), and cast parts (e.g., cast metal parts) are aligned, and are used as feature sets (in some embodiments, extended with environmental data including both ideal and actual environmental factors) for training a neural network. Alignment is a technical problem to be overcome, and approaches are described below to help improve alignment between the representations of the design, the cast mold, and cast parts to address this problem. Alignment is important in allowing for interoperability of the various sets of representative data for provisioning into the system for deep learning.

Relationships between the features of the feature set are estimated through training weighted interconnections between computing nodes of the neural network, which represent a transfer function which can be utilized as a mechanism through which estimated outputs can be predicted (e.g., if the temperature rises by 5 Kelvin, estimate the error in the cast part), and variables can be modified to vary an output (e.g., a cause of error was the variance between ideal and actual humidity, so a dehumidifier is used to reduce an ambient humidity). Similarly, root cause analysis can be utilized to estimate the factors (e.g., materials expansion/contraction from temperature may be more pertinent than humidity) which contribute most to error generation.

As noted, in some embodiments, the neural network is not confined to recognizing relationships between three-dimensional physical spatial data. Properties that affect the casting process such as temperature and humidity can be appended to the arrays in the data set in order for the neural network to account for different environmental conditions.

The machine learning approach may include feature sets directed to: (1) part geometry, (2) process (including mold features, and control parameters, such as pouring temperature), and (3) environment. Each of these aspects, or combinations thereof, can be features of the neural network.

The neural network also then be used (e.g., back propagated, run in reverse) to create an improved mold that will result in final cast parts that more closely resemble the original digital representation. This is particularly useful, for example, where environmental variables cannot be modified (e.g., a difference in gravity experienced at different locations, or a difference in environmental oxygen saturation levels at different altitudes). Thus, users can adjust the shape of the mold depending upon the conditions they are undertaking the casting process in.

Permutations and combinations of these uses are contemplated, for example, an improved mold can be established along with variations in the environmental controls that can be controlled (e.g., temperature, humidity), the improved mold including modified aspects to account for variations in the environmental controls that cannot be controlled (e.g., gravity, oxygen saturation levels).

As a result, more accurate parts can be created, and the waste involved in rejecting defect parts and post-cast grinding is reduced. Furthermore, the application of some embodiments described herein enable materials casting in non-ideal locations or environments, through neural-networked guided modifications of the cast mold or improved control of environmental or manufacturing parameters. Furthermore, not all materials are tooled well by grinding, and the approaches described herein can be especially useful for manufacturing in relation to such materials (e.g., softer materials or alloys).

The neural network system, in some embodiments, is a special purpose machine, such as a rack server appliance or a physical hardware device that is electronically coupled to one or more controller circuits controlling aspects of materials casting, including, foundry robotic systems, casting inspection mechanisms, casting cleaning mechanisms, casting pouring mechanisms, sensors, environmental controllers, among others. A feedback loop, in some embodiments, is established to monitor errors over a duration of time and across a number of cast parts. The neural network system can be configured using computer readable medium.

Outputs of the system can include, in various embodiments, different types of data structures or data messages.

In a first embodiment, the output of the system are a set of control signals that are utilized by process controllers to modify casting process parameters. In a second embodiment, the control signals are used to modify environmental parameters. In a third embodiment, the output of the system is a data structure (e.g., a data object) storing modified process parameters that are modified based on the inputs provided to the trained neural network. In a fourth embodiment, the output is the trained neural network itself, or a data representation thereof (e.g., a data structure storing the interconnections and weightings and filter parameters, and may include hyperparameters). In a fifth embodiment, the output of the system (e.g., where the system is coupled to or includes a casting apparatus) is a physical casted part, casted based at least on the control signals generated using the trained neural network.

The system can be provided as a distributed resources (e.g., cloud resources) based implementation, whereby process parameters or other environmental factors are input, and the trained neural network is then adapted to receive these parameters to generate a set of improved output target process parameters or other environmental factors (or control signals thereof for modifications). In this scenario, there may be some input factors that can be designated as fixed (e.g., sometimes it may be impossible to modify an altitude of a casting factory, while the temperature can be changed, or vice versa).

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 1C is a method diagram illustrating steps of a sample method for error reduction in materials casting, according to some embodiments.

FIG. 17 is an illustration of an improved actual cast part having improved tolerances using the modified wood pattern, according to some embodiments.

DETAILED DESCRIPTION

Embodiments described herein present an application of deep learning to improve the results of the sand casting process in the manufacture of metal industrial parts. Such process is not limited to sand casting, and can be more broadly applicable to materials casting, in some embodiments.

Figure 1A:
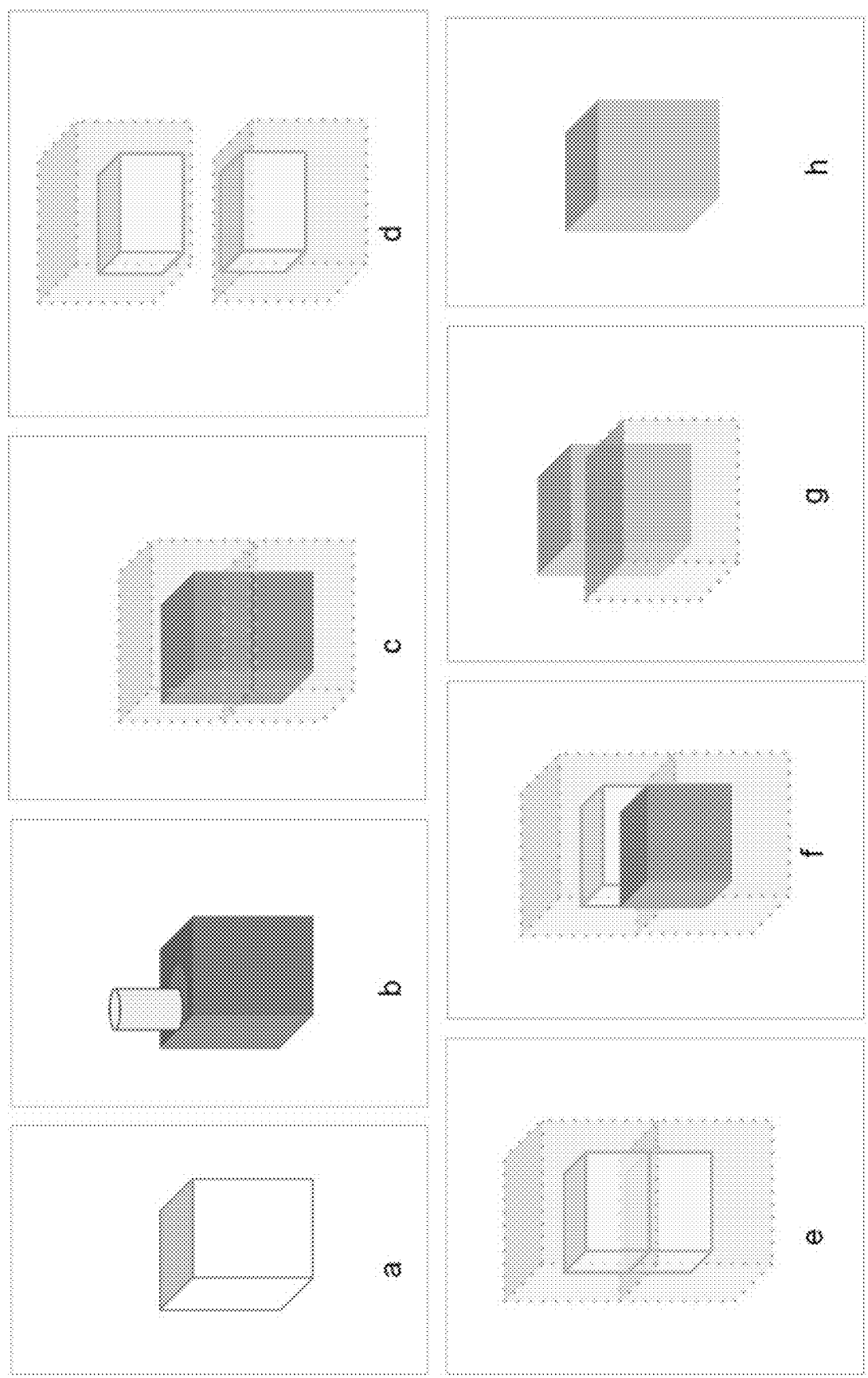
FIG. 1A is a process flow diagram showing an example sand casting process.

FIG. 1A is a process flow diagram showing an example sand casting process. The objective of the sand casting metal manufacturing process is to create cast metal parts, usually using a digital 3D CAD file as a starting point.

This description is non-limiting, and only intended at a high level to describe the sand casting process for metal parts manufacture. As noted below, the embodiments contemplated are not only limited to sand casting or metal parts manufacture, and this is provided for illustrative purposes.

a) A digital 3D CAD file is used as a starting point.
b) Using a CNC milling machine or other method, a wood block is machined into a wood pattern. This wood pattern is in form the same as the final intended metal part.
c) The wood pattern is then encased into casting sand, which is packed around it using a binder. A release agent is applied to the wood mold prior to sand packing.
d) The packed sand mold is created as two halves, removing the wood pattern.
e) The two halves of the packed sand mold are put back together.
f) Molten metal is poured into the sand mold and let to solidify, through a thin hole at top not here depicted.
g) The sand mold is broken away from the cast metal part.
h) Any excess material is ground off of the cast metal part.

A technical issue that arises in the manufacturing process is that the final output cast metal part is different from the intended part as represented by the original digital 3D CAD file, as a result of cumulative errors in the sand casting process, as listed below.

the creation of the wood pattern from the 3D CAD file through CNC machining the human error introduced through the hand-finishing of the wood pattern the error introduced in creating the sand mold by packing it around the wood pattern using casting sand, binders, and release agents the error introduced in removing the sand mold from the wood pattern the thermodynamic interactions of the metal being poured into the sand mold the shrinkage and change in volume and shape that occur as the metal cools variations in humidity and temperature in the casting environment Other issues are possible.

To resolve some of these issues, a modified process enabled by deep learning is described below.

The process here is described using the example of the sand casting of metal parts, however similarly applies to other types of manufacture using molds, including but not limited to plastic injection molding, blow molding, compression molding, and other materials and methods.

The descriptions in this document use the example of digital point clouds to represent form, however similarly applies to other types of the digital representation of form, including but not limited to triangulated meshes, voxels, and NURBS surfaces.

Figure 1B:
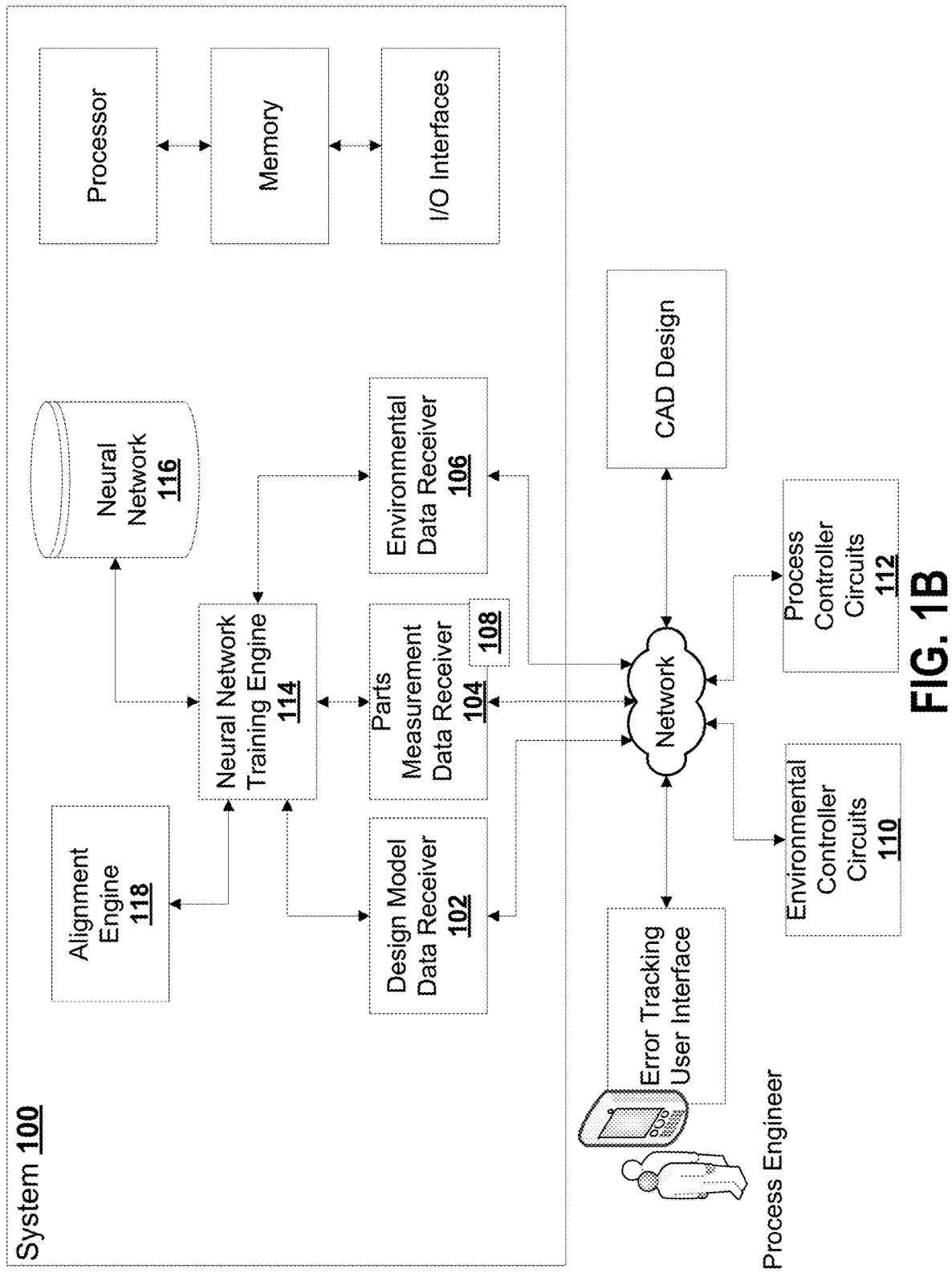
FIG. 1B is an example block schematic diagram of a system for error reduction in materials casting, according to some embodiments.

FIG. 1B is an example block schematic diagram of a system for error reduction in materials casting, according to some embodiments.

The system 100 shown in FIG. 1B is an example computer system that is performed on computer components, including processors, computer memory, and data storage devices, and may be conducted at a single server, multiple servers, or on distributed computing resources (e.g., cloud computing). The elements shown are meant to be non-limiting, and other variations having alternate, different components are contemplated.

The system 100 includes a design model data receiver 102, a parts measurement data receiver 104, and an environmental data receiver 106. In some embodiments, the features tracked by environmental data receiver 106 are considered static variables.

The design model data receiver 102 receives a data payload representing a reference 3D digital representation, and the data payload can include, for example, point clouds, voxels, polygons, etc. In some embodiments, the received data is transformed from a CAD file by the design model data receiver 102 into a format that can be provided to the neural network for processing (e.g., point clouds, voxels, or polygons are generated from the CAD file).

Similarly, the parts measurement data receiver 104 is configured to receive data payloads indicative of information scanned from cast parts or cast mold representative of geospatial data and/or other material characteristics of either the cast parts or cast mold.

The parts measurement data receiver 104 is coupled to a sensor array 108 which can include one or more non-destructive testing and/or measurement devices that are adapted to provide a data stream indicative of physical properties of the cast parts or cast mold, such as spatial dimensions, surface qualities (e.g., smoothness, hardness), etc.

Various probes and/or lasers, RADAR, X-Rays, strain gauges, etc., may be utilized by sensor array 108. In some embodiments, the received data is transformed from the sensory data by the parts measurement data receiver 104 into a format that can be provided to the neural network for processing (e.g., point clouds, voxels, or polygons are generated from the CAD file). For example, a few hundred scans of different cast parts may be utilized for iterating and training the model. Other numbers are possible.

The environmental data receiver 106 is configured to track environmental conditions of the casting process, and may include temperature probes, humidity sensors, accelerometers, gyroscopes, gravity sensors, air composition sensors, air pressure sensors, among others. In some embodiments, system 100 is coupled to an environmental systems controller 110 (e.g., controller circuits) which can be utilized to modify environmental aspects of the casting process, such as humidity, temperature, etc., through transmission of control signals (e.g., turn on heater, turn on humidifier).

In some embodiments, the received data is transformed from the sensory data by the environmental data receiver 106 into a format that can be provided to the neural network for processing (e.g., metadata for extending a vector and inclusion into the feature space of the neural network).

Similarly, in some embodiments, system 100 is coupled to a casting process controller 112, which may modify manufacturing parameters associated with the casting process, such as a temperature of a particular step, a density of sand packing, a duration of cooling, binding agents, etc. These aspects may also be tracked by the neural network, for example, as metadata for extending a vector and inclusion into the feature space of the neural network.

The casting process controller 112 may transmit control signals for modifying the positioning of gates (where metal flows into the mold), the operation and/or geometry of channels for venting gases, etc. For example, a pulse-width modulator can be used to control on/off signals or other types of signal used for controlling gating and/or various electrical switches.

The data payload are received by a neural network training engine 114, which maintains a neural network 116 having one or more interconnected computing nodes, the neural network 116 tracking a relationship between inputs and outputs such is established through the weights of the weighted interconnections that represent aspects of the feature set. As described in further detail below, the neural network 116 is specially configured to be trained over a period of time as parts are cast and environmental/manufacturing process variables are tracked and input into the neural network. The neural network 116 may include multiple neural networks, and different layers.

For example, a 3D CNN can be used to capture space-dependent point cloud data, a RNN or variant such as a LSTM can be used to capture time-dependent data, and a feed forward neural network can be used to combine the outputs of the RNN and CNN for concatenation with static variables, having a number of layers, including, for example, de-convolutional layers, for outputting predicted pre-grind point clouds.

The neural network 116, in some embodiments, is configured to track error terms as between the representation of the ideal cast part, and the actual cast part, and in some embodiments, adapted to control process characteristics to minimize the error term. As noted below, in some embodiments, the controllable process parameters are controlled through generation of control signals to modify aspects such as temperature, humidity, bake time, etc., and non-ideal non-controllable process parameters may be accounted for by modifying aspects of the cast mold, or other controllable process parameters, gating parameters, venting parameters, gate positioning, riser operation, chill operation, etc.

As the neural network 116 is trained with further examples of pre-grind cast metal parts with errors, the error terms and the relationships captured within the neural network more closely approximate the interrelationships between components of the feature space. The errors from the casting process accumulate over time as cumulative errors, and the neural network 116 is a useful tool in heuristically modelling complex relationships that otherwise would be difficult to establish.

Accordingly, in some embodiments, the neural network 116, after training, can be back propagated (e.g., reverse-operated) such that a specific cast mold can be generated for a given desired cast output in view of a set of fixed environmental variables. In another embodiment, the neural network 116 can be utilized to establish an output data structure of expected error and grinding required for a given set of inputs, which can be provided to downstream control systems or administrative interfaces (e.g., for provisioning a graphical user interface).

An alignment engine 118 is utilized to provide a re-alignment, for example, in digital space, of representations between the 3D CAD model, surfaces thereof, a cast mold (described in a non-limiting example as a wood pattern or a wood mold), and cast parts, and corresponding 3D surfaces generated thereof.

In a first embodiment, the output of the system 100 are a set of control signals that are utilized by process controllers to modify casting process parameters (e.g., machine interpretable instruction sets indicative of actuator/servomotor control messages).

In a second embodiment, the control signals are used to modify environmental parameters (e.g., machine interpretable instruction sets indicative of desired temperatures, humidity, that may cause fans, radiators, coolers, etc. to operate).

In a third embodiment, the output of the system is a data structure (e.g., a data object) storing modified process parameters that are modified based on the inputs provided to the trained neural network (e.g., an array storing updated target parameters).

In a fourth embodiment, the output is the trained neural network itself, or a data representation thereof (e.g., a data structure storing the interconnections and weightings and filter parameters, and may include hyperparameters).

In a fifth embodiment, the output of the system (e.g., where the system is coupled to or includes a casting apparatus) is a physical casted part, casted based at least on the control signals generated using the trained neural network. The trained neural network modifies targeted process characteristics in an attempt to optimize for the ideal part, and the physical casted part that is output should be closer to the ideal part than without adjustments (e.g., tighter tolerances), such that less remediation steps are required (e.g., less grinding, edging, burr removal).

This is particularly useful whereby parts are being manufactured on a large scale, or very complex parts are being manufactured (e.g., in an automotive casting of vehicle engine parts or fastener clips). Other types of pieces being casted can include pipes, jewelry, household metal/alloy objects, among others. Materials used in casting can include various metals and alloys, such as cast iron, steel, magnesium, aluminum, etc. Casting can be used to create, for example, vehicle parts, aircraft parts, etc.

The system 100 can be provided as a distributed resources (e.g., cloud resources) based implementation, whereby process parameters or other environmental factors are input, and the trained neural network is then adapted to receive these parameters to generate a set of improved output target process parameters or other environmental factors (or control signals thereof for modifications). In this scenario, there may be some input factors that can be designated as fixed (e.g., sometimes it may be impossible to modify an altitude of a casting factory, while the temperature can be changed, or vice versa).

Figure 9:
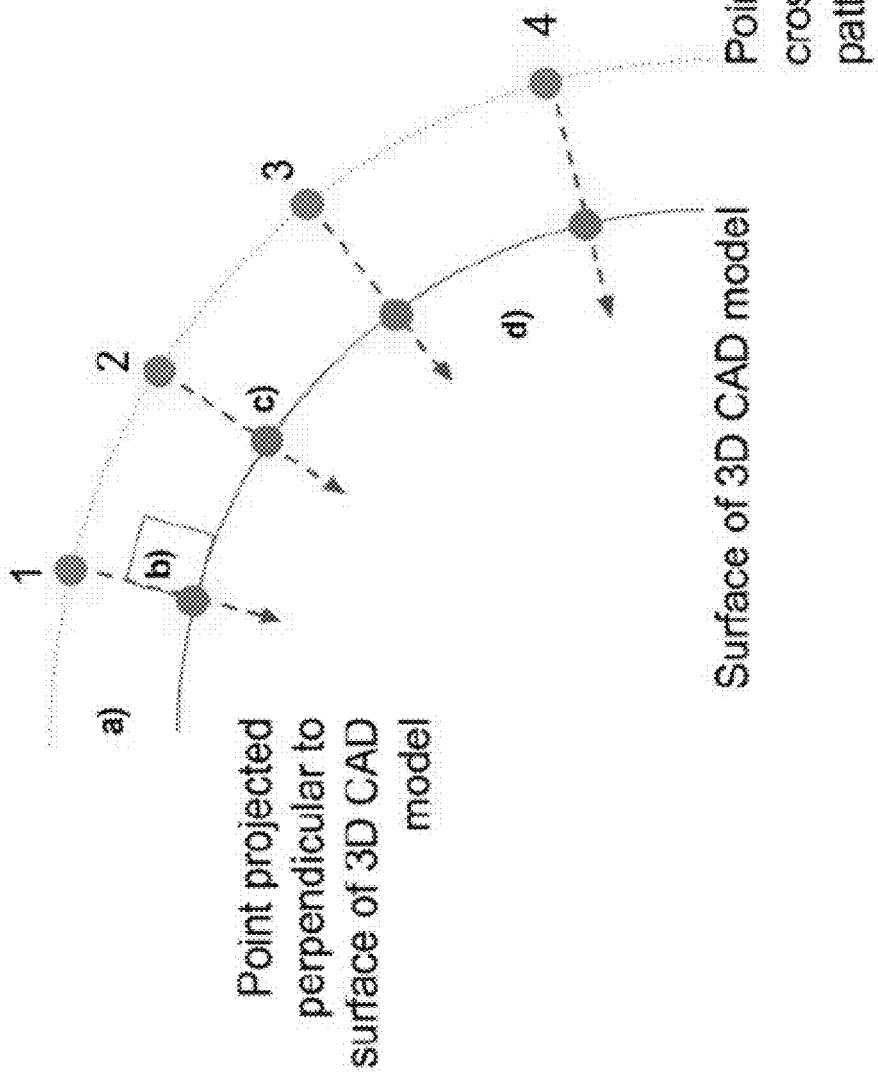
FIG. 9 is a partial view showing an illustration of misalignment and point projection, according to some embodiments.
Figure 10:
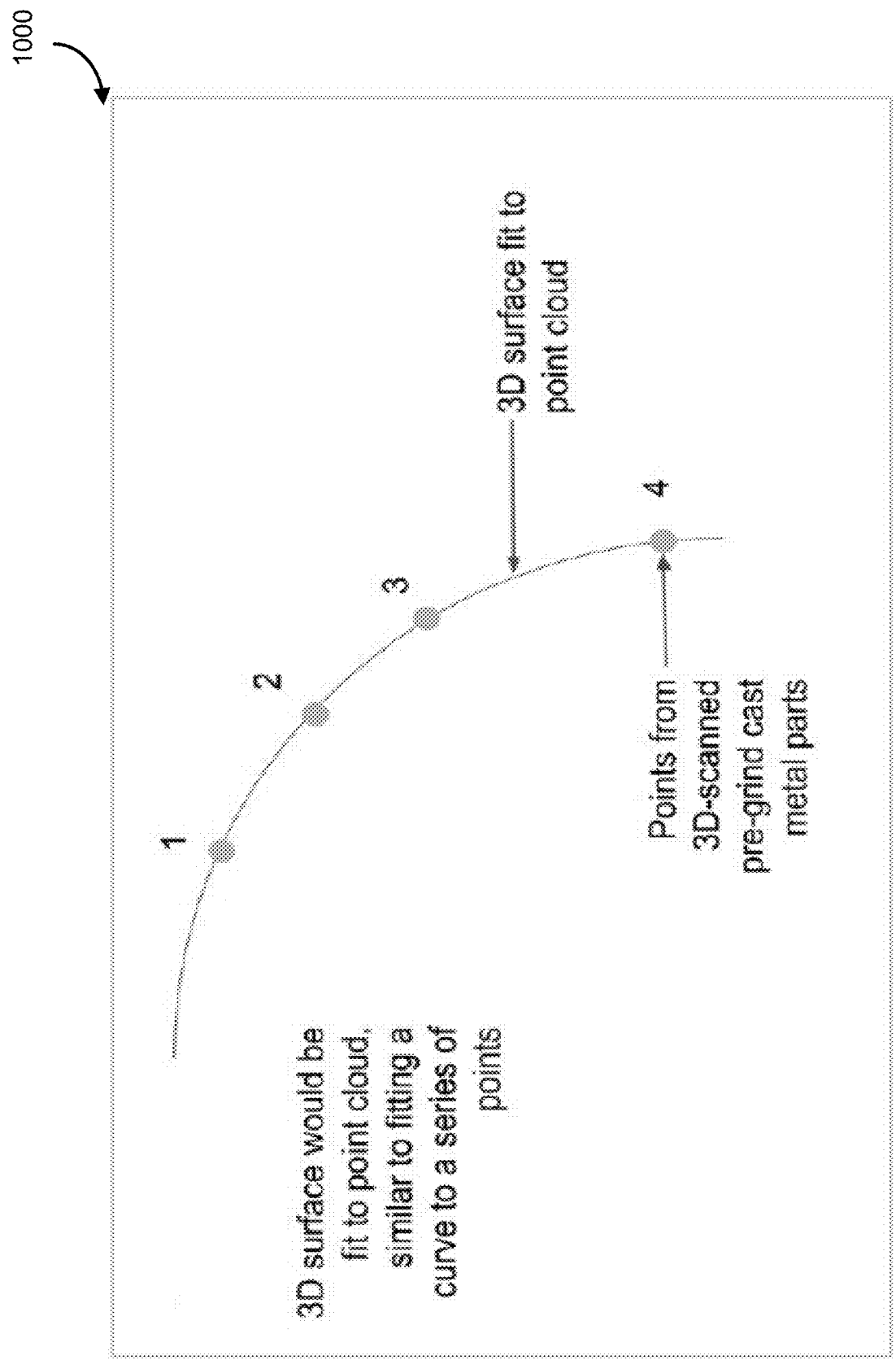
FIG. 10 is an illustration of an example fitting of a curve, according to some embodiments.
Figure 11:
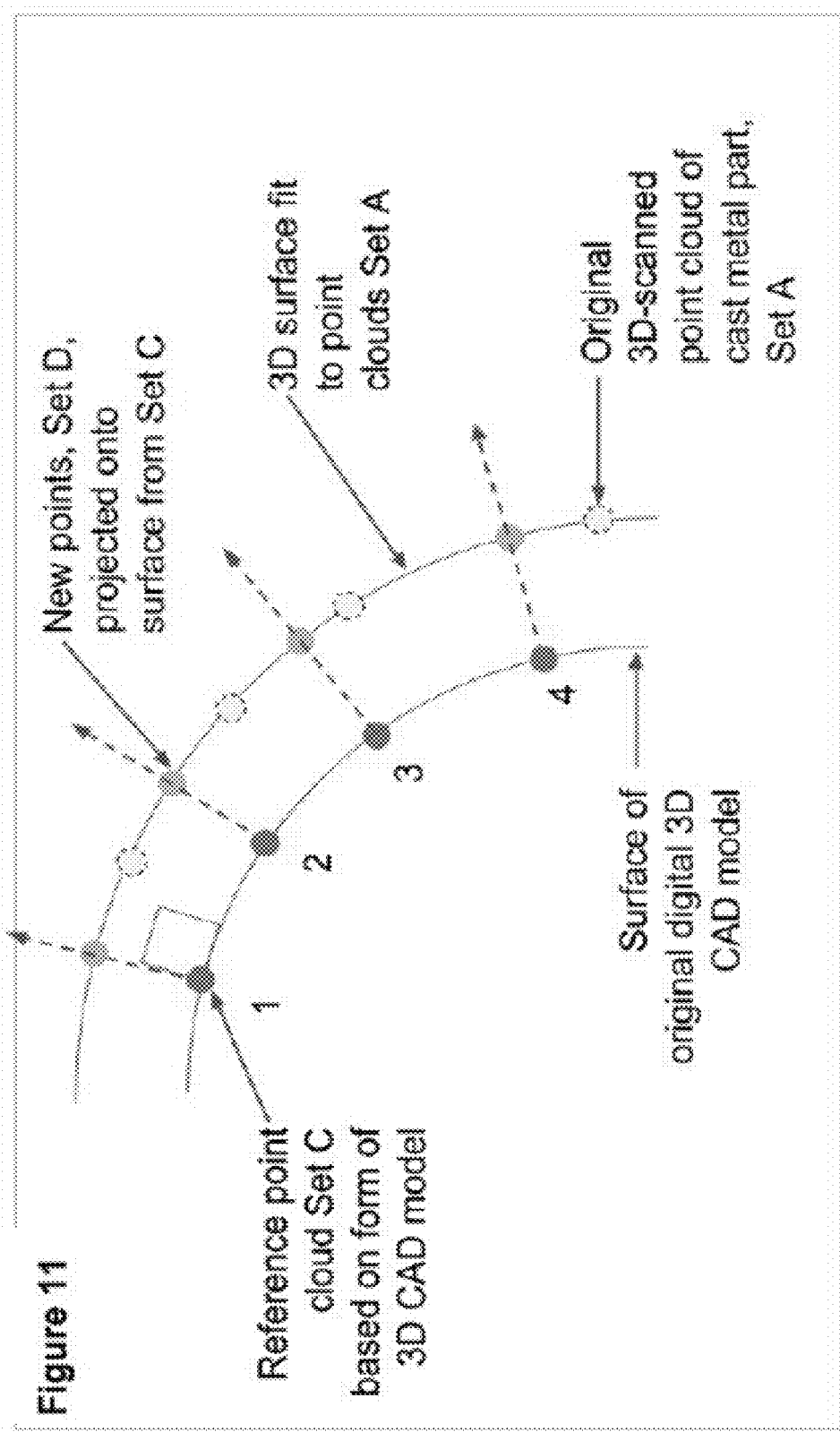
FIG. 11 is an illustration of an example set of intersections and new points, according to some embodiments.

Examples of alignment are described in various embodiments through FIGS. 9-11, where the alignment engine 118 is configured to project points and determine intersections to establish improved alignment (e.g., using curve fitting, point projection, splines), which aids the neural network 116 by improving the mapping process. As noted below, the alignment engine 118 provides an improved alignment which may reduce or eliminate a need for manual remediation of alignment issues, such as through seam stitching, etc. The alignment engine 118 provides a set of parameter-mapped 3D representations (e.g., point clouds), which are utilized, in conjunction with reference data sets that may include tracked variable metadata (e.g., temperature and humidity of casting environment, ideal and/or actual). The parameter-mapped 3D representations are provided to the data sets to train the neural network, as noted in FIG. 12.

FIG. 1C is a method diagram illustrating steps of a sample method for error reduction in materials casting, according to some embodiments. The steps are shown as non-limiting examples, and further details of various embodiments of the method are provided in relation to FIGS. 2-20.

At 152, a prototype part is manufactured from the 3D CAD model, and a cast mold is created from the prototype part at 154.

A reference 3D digital representation is established from the 3D CAD model at 156, and a plurality of metal parts are cast from the cast mold at 158. 3D digital representations of the metal parts are used to establish the neural network training data set at 160, including, in some embodiments, metadata representing environmental or processing characteristics. The neural network is trained over time through comparing the reference 3D digital representation with the neural network training data set at 162.

In some embodiments, the neural network is utilized at 164 to modify or control environmental variables, at 166 to operate the trained neural network in back propagation mode (e.g., in reverse) to create a 3D digital representation of a new prototype part to create a new cast mold (which can be used for casting improved metal parts with reduced errors), or to generate data structure outputs representing expected errors for a given set of environmental factors and cast mold.

Other approaches are contemplated. For example, a neural network can be trained on these inputs: 1) 3D point cloud wood pattern, 2) metadata from casting environment. The output of the model would be the difference, or deviations (positive or negative) between the pre-grind metal piece and the wood patter.

After seeing enough examples, the system would reliably learn to predict these deviations. To help with designing the wood pattern, explain-ability methods can be applied. For instance, back-propagating the deviation between pre-grind piece and wood pattern all the way back to the inputs could indicate which variables (this could be a parameter in the casting/cooling process, or specific points in the wood pattern point cloud. Depending on which variable is flagged as most important, the system could suggest to change this variable (changing wood pattern, but also trying to change temperature or humidity). Another way to do this is to do local sensitivity analysis on the inputs to see what changes would help reduce the deviations.

Specific approaches may be use a neural network to predict a regression output (real number in millimeters that can be positive or negative) representing the deviation between the pre-grind piece and the wood pattern. When it learns the correct mapping, the system can suggest inputs to tweak (see proposed methodology above and specific explainability methods we can use) to obtain the best output possible (e.g., zero deviation, or within all required tolerances, or to reduce an expected amount of post-casting grinding).

Figure 1D:
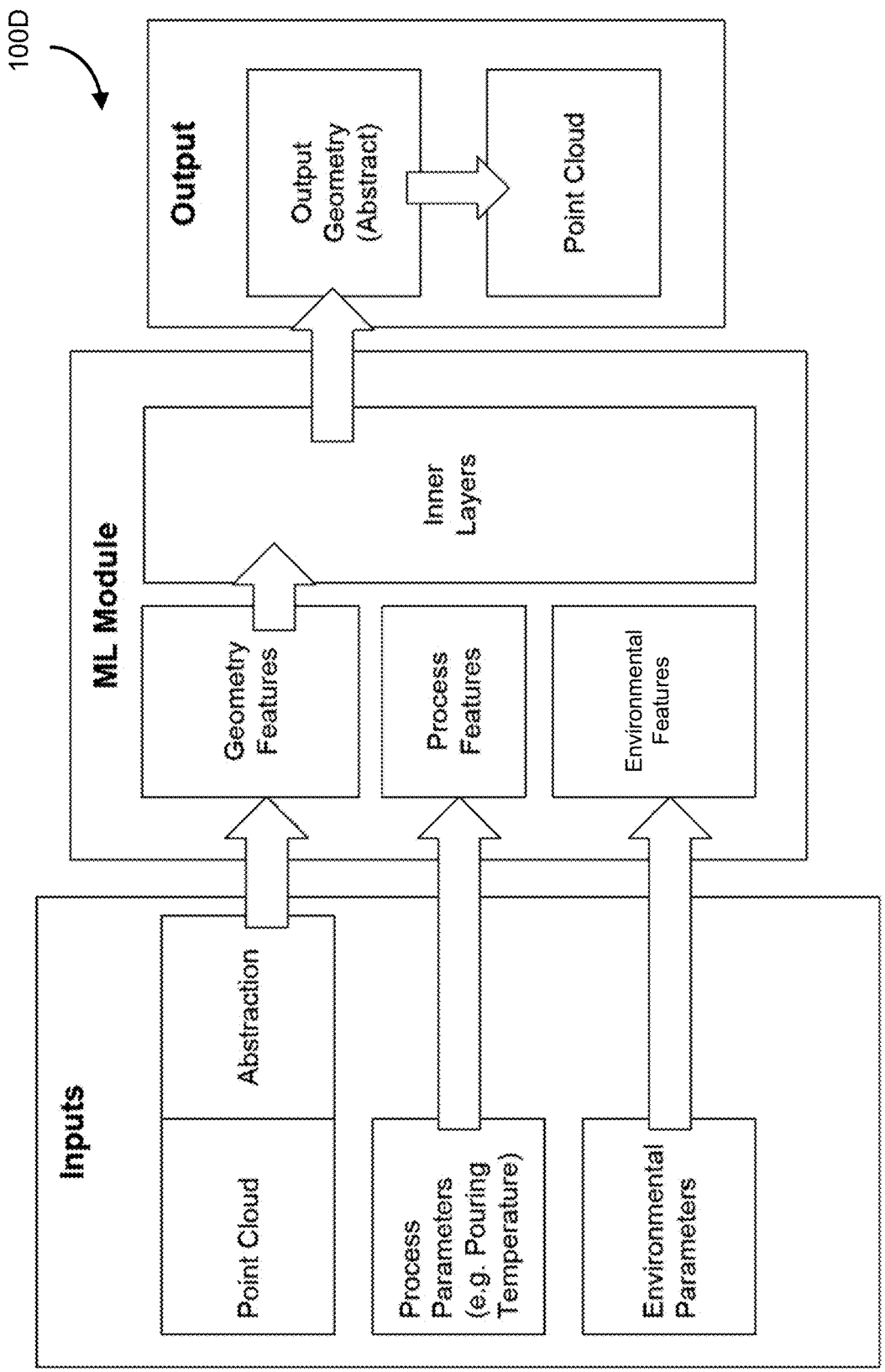
FIG. 1D is a block schematic of an example machine learning engine model for error reduction in materials casting, according to some embodiments.

FIG. 1D is a block schematic 100D of an example machine learning engine model for error reduction in materials casting, according to some embodiments. FIG. 1D illustrates a set of inputs described in various embodiments here, and the machine learning module receives these inputs as features (e.g., geometry features, process features, environmental features, which are then passed into inner layers that are used to map to output geometries and the measured point clouds.

Over a number of iterations, the inner layers, representing the model used to map between the inputs and the outputs, is updated to modify weightings between interconnected features and/or hidden nodes in the inner layers to more closely approximate the relationship between the inputs and the outputs. The model is iteratively trained, and with a sufficient set of examples, the model can then be used for generating predictions based on the relationships managed by the trained model. The model can be used, for example, to modify inputs (e.g., process parameters, environmental parameters, mold shape, CAD shapes) to modify the output, etc. Conversely, in some embodiments, known outputs can be used to estimate unknown inputs.

Furthermore, in additional embodiments, where the process is planned for operation with a set of fixed inputs that are different than inputs from which it is trained, the model can be used to estimate an expected output, and/or to modify controllable inputs to modify the expected output. For example, the model can be trained in relation to a set of casting iterations in locations based in the Northern hemisphere.

A producer may then wish to establish a manufacturing operation in a new environment, for example, based in Australia. The new operation has some known characteristics that cannot be easily modified, such as gravitational effects, oxygen saturation levels in air, etc. For a desired output (e.g., an engine intake manifold), the trained model can be used to modify other controllable inputs (e.g., process parameters) or the manufacturing of the mold accordingly to help ensure that the output cast part meets the required tolerances.

Examples provided below are non-limiting and provided in the context of sand-casting for illustrative purposes. The description provided below is not limited to sand-casting, and can be applicable to other casting processes. Similarly, while point clouds are described and shown as examples, other types of 3D representations are possible.

A number of illustrative steps are provided below.

Figure 2:
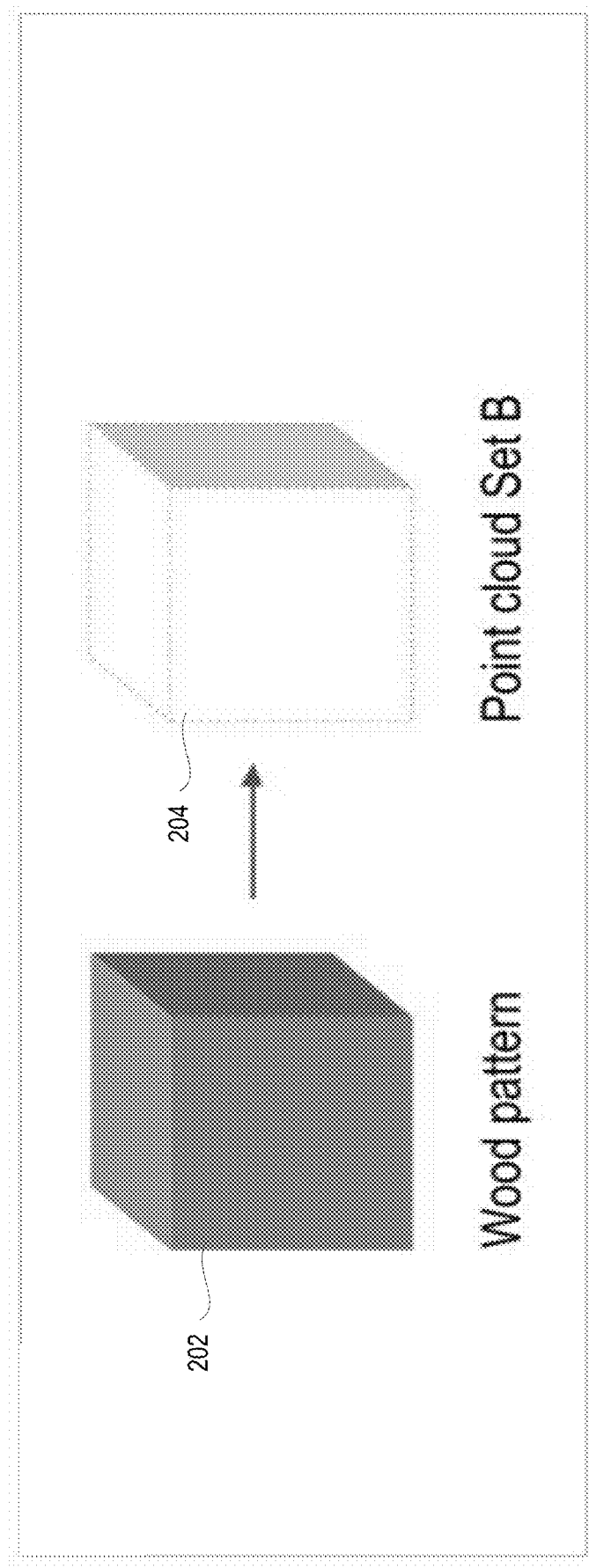
FIG. 2 is an illustration showing a transition from a cast mold (e.g., wood pattern) to a point cloud Set B, according to some embodiments.

The implementation can involve taking multiple wood patterns CNC-milled from the original digital 3D CAD file and 3D-scanning those into 3D point cloud Set B or other 3D digital representation. FIG. 2 is an illustration showing a transition from a cast mold (e.g., wood pattern 202) to a point cloud Set B 204, according to some embodiments.

Figure 3:
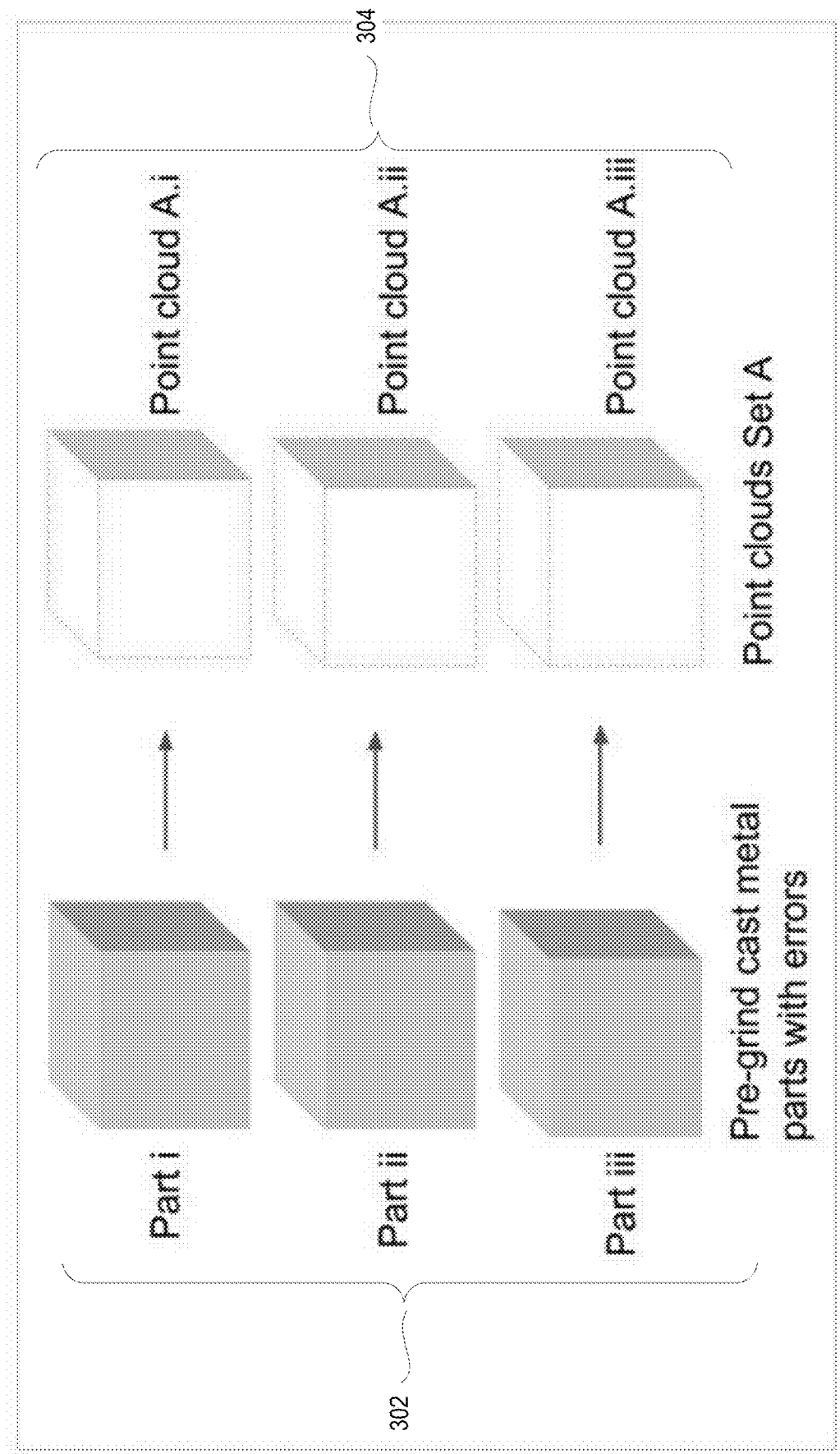
FIG. 3 is an illustration showing a transition from a cast metal parts with errors to point clouds of Set A, according to some embodiments.

The implementation can involve taking a number of the pre-grind (as they come out of the mold) output cast metal parts 302 and 3D-scan those into 3D point clouds Set A 306 or other 3D digital representation. FIG. 3 is an illustration showing a transition from a cast metal parts with errors 302 to point clouds of Set A 304, according to some embodiments.

Figure 4:
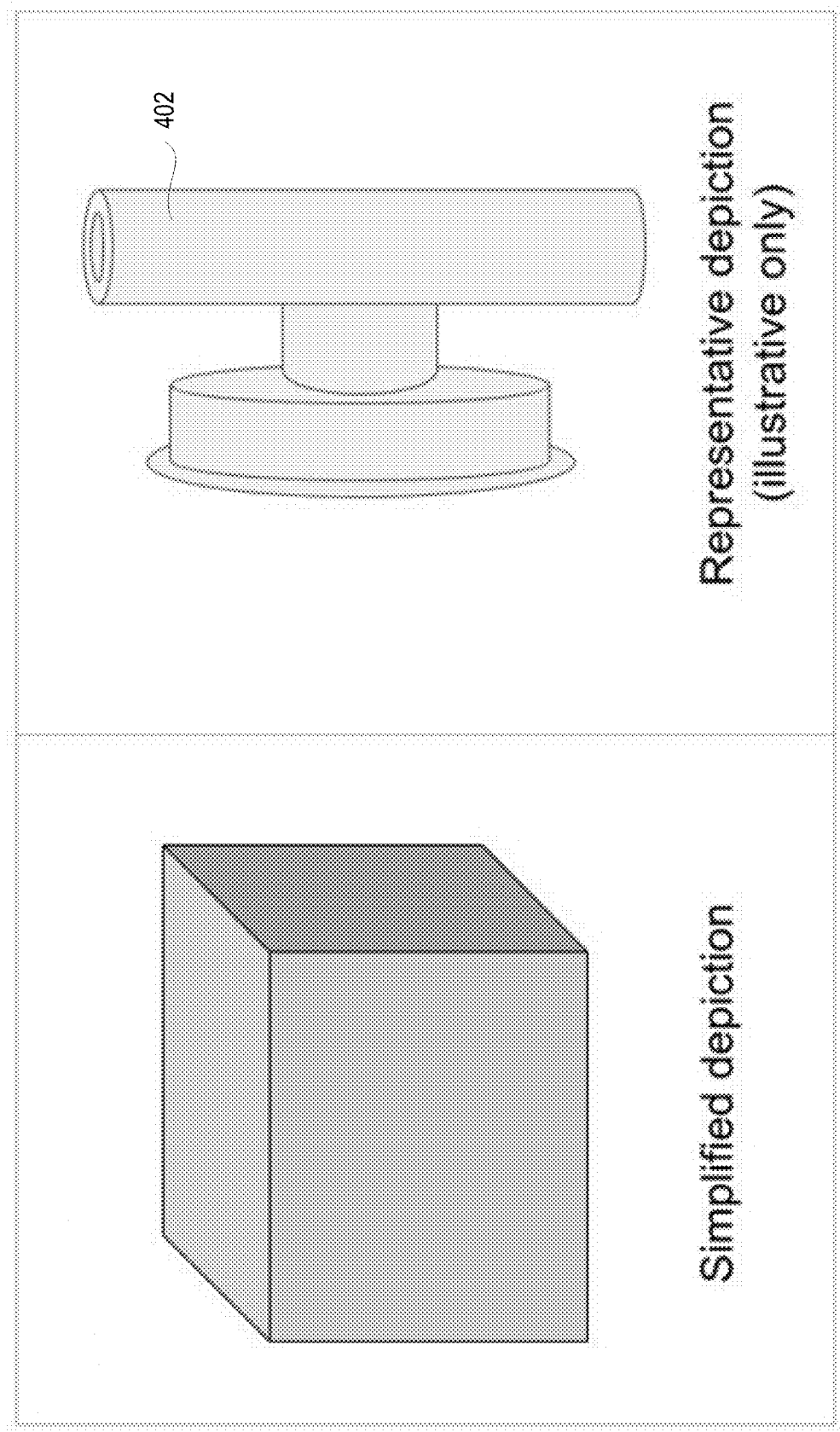
FIG. 4 is an illustration of an example complex part, according to some embodiments.

The depictions of the metal parts under consideration have been heretofore depicted as simple metal cubes, actual intended parts would be much more irregular and complex. FIG. 4 is an illustration of an example complex part 402, according to some embodiments.

Figure 5:
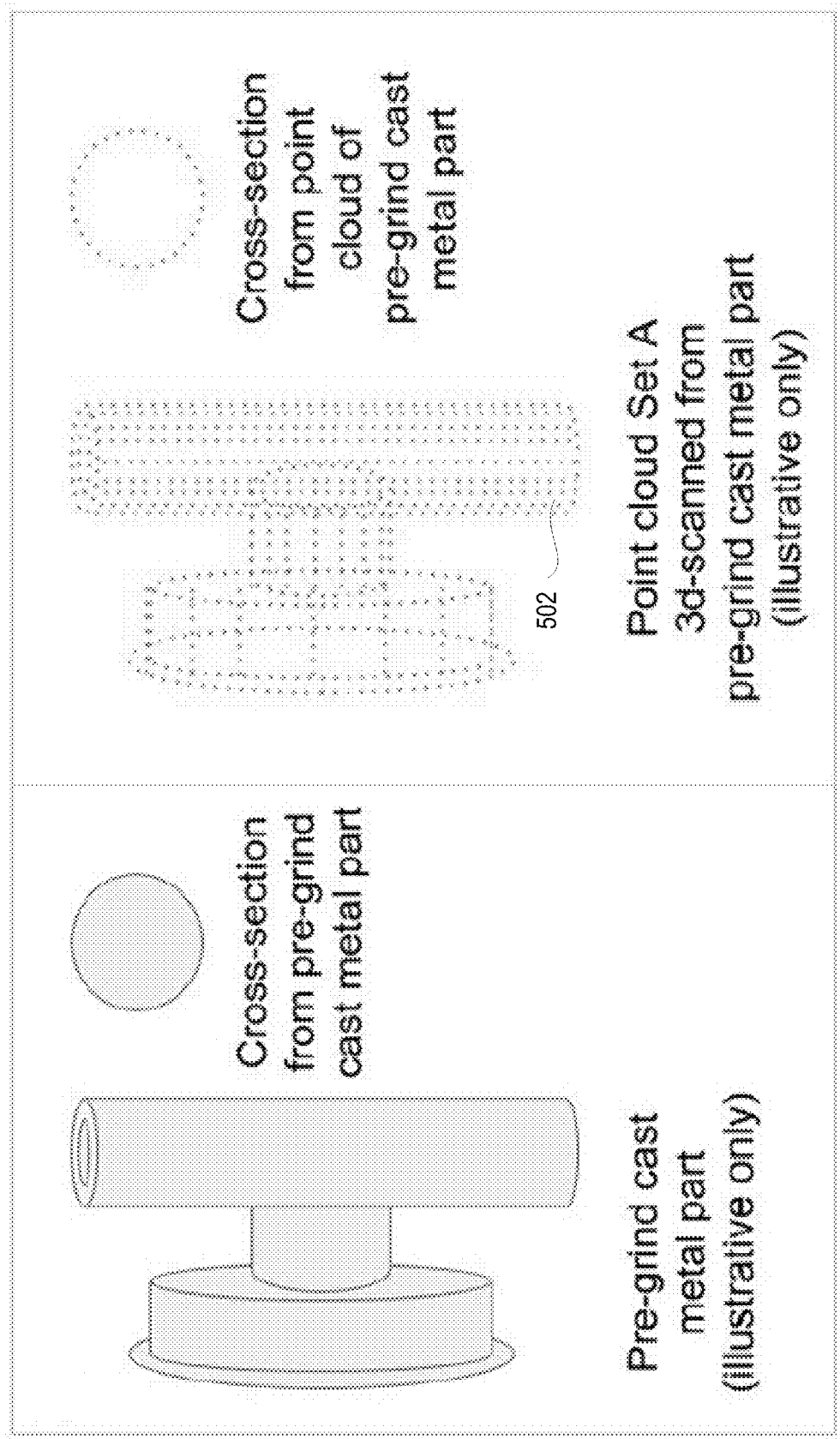
FIG. 5 is an illustration showing a point cloud that could be generated from the complex part, according to some embodiments.

Resultant point clouds in point cloud Set A 3D-scanned from pre-grind cast metal parts can be complex and irregular in nature. A cross-section is depicted as illustrated to describe relevant issues. FIG. 5 is an illustration showing a point cloud 502 that could be generated from the complex part 402, according to some embodiments.

Figure 6:
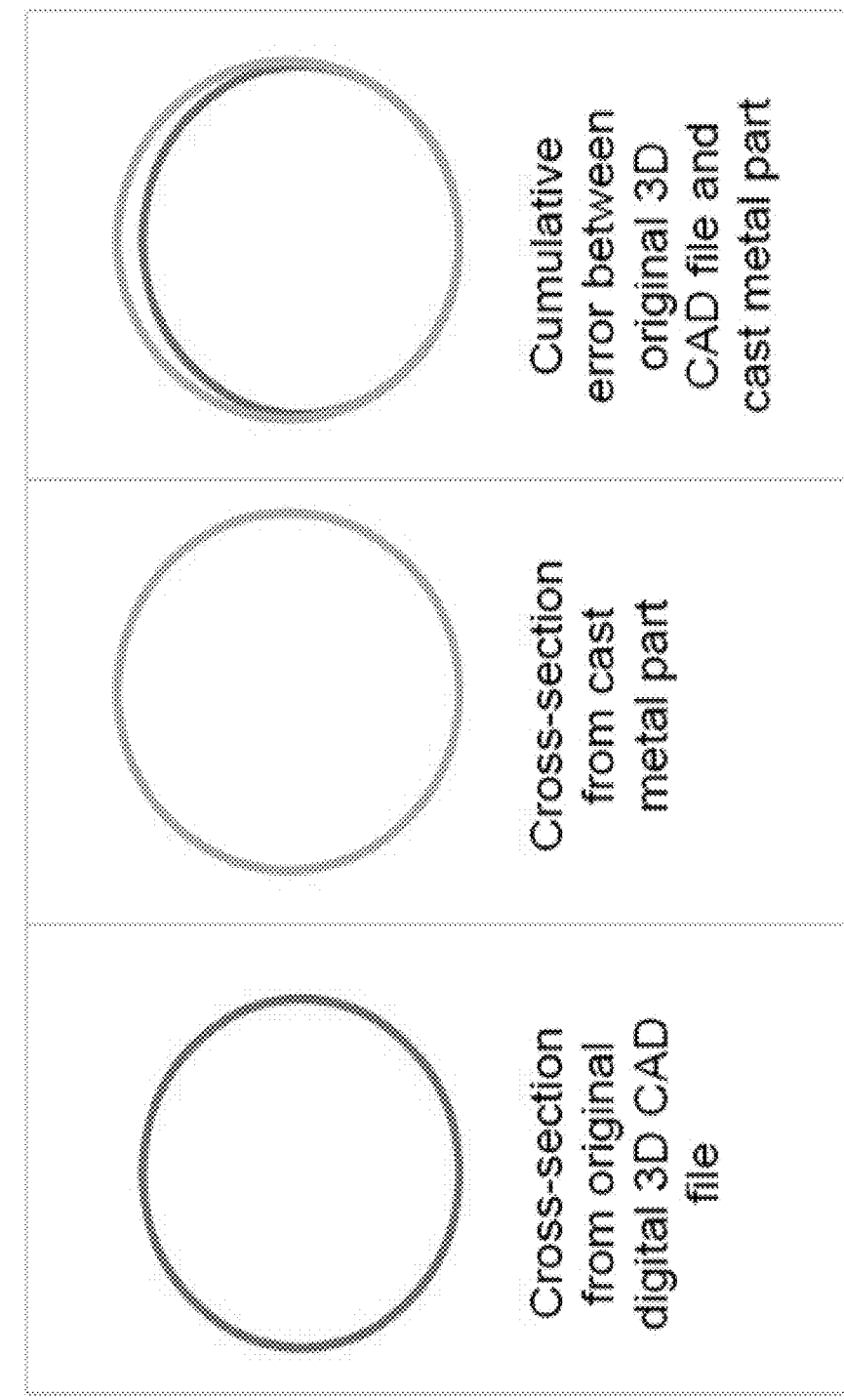
FIG. 6 is an illustration showing cumulative errors that may occur through the process, according to some embodiments.

As previously described, cumulative errors in the manufacturing process result in a pre-grind cast metal part that is different than intended as compared to the original digital 3D CAD file. FIG. 6 is an illustration 600 showing cumulative errors that may occur through the process, according to some embodiments.

Figure 7:
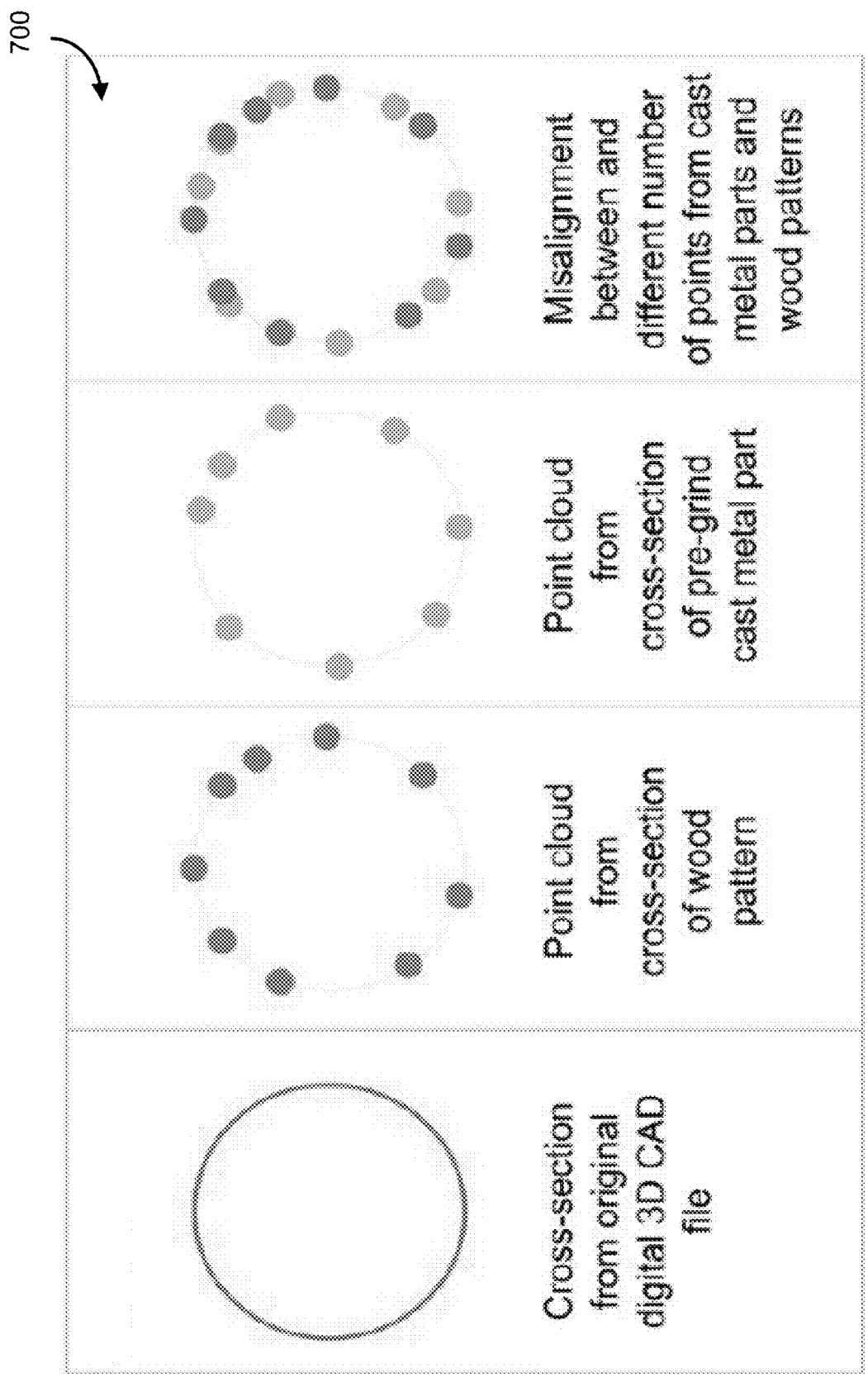
FIG. 7 is an illustration showing potential misalignments from generated point clouds, according to some embodiments.

Thus, data sets include the original digital 3D CAD file, and a Set A of point clouds for each 3D-scanned pre-grind cast metal part (i), (ii), to (n). One issue to resolve is that each set for the cast metal parts from Set A, (A.i, A.ii, and so on), and of the wooden patterns, Set B, are separately 3D-scanned from different physical objects, and as an artifact of the 3D-scanning process, each of these point clouds is mis-aligned both in position and in number. FIG. 7 is an illustration 700 showing potential misalignments from generated point clouds, according to some embodiments.

Figure 8:
FIG. 8 is a table mapping point cloud labels to specific geospatial coordinates and other parameters (e.g., metadata), according to some embodiments.

For purposes of machine learning, it is helpful to be able to translate each of these sets of point clouds into a parameter-mapped set of values, as illustrated in FIG. 8. FIG. 8 is a table 800 mapping point cloud labels to specific geospatial coordinates and other parameters (e.g., metadata), according to some embodiments. Each point in the point cloud would be considered a parameter, each comprised of 3D location values X, Y, Z, and potentially other metadata, including, for example, physical characteristics tracked in relation to the specific point (or global/local area variables). The 3D location values are not limited to Euclidean space and other types of coordinate transformations and representations are possible.

A reference mapping is created, point cloud Set C, using the original digital 3D CAD file, and the 3D-scanned point cloud of the wood pattern, point cloud Set B. FIG. 9 is a partial view 900 showing an illustration of misalignment and point projection, according to some embodiments.

For example, the point cloud and the 3D CAD file would be aligned in digital space. This alignment is easier with the wood pattern than with the cast metal parts as they are much more similar in form, and as such the wood pattern 3D-scan is used for this purpose.

Lines from each point in the point cloud would be extended from each such point along the path of the surface normals of the 3D CAD model, meaning here perpendicular to the surface of the 3D CAD model, until such a line hits the surface of the 3D CAD model.

A new point would be sampled at the intersection of each such projected line and the surface of the 3D CAD model.

These new sampled points would then make up a new point cloud representing the form of the 3D CAD model, with each point being a 1:1 mapping of the points in the point cloud from the scanned wood pattern.

The preceding provides us with a reference set of cloud points, Set C, perfectly aligned with the surface of the original digital 3D CAD file.

Next, the process includes converting each point cloud 3D-scanned from the pre-grind cast metal parts into 3D surfaces. This would be the 3D version of fitting a curve to a series of points. The surface type could be a NURBS (non-uniform rational b-spline) as a series of patches, or other types of approaches. FIG. 10 is an illustration 1000 of an example fitting of a curve, according to some embodiments. Less automatable aspects of generating surface models from cloud data, such as stitching seams between NURBS patches, would not be required as the use of the 3D surface is for reference of adjusting cloud points only.

Each of the 3D surface models generated from the 3D-scanned pre-grind cast metal parts, from point clouds Set A, are digitally aligned to the reference point cloud Set C that is aligned with the original digital 3D CAD model.

Each of the cloud points would then be projected from the reference point cloud Set C such that it intersects with the surface of each generated surface model based on point clouds Set A, 3D-scanned from the pre-grind cast metal parts, generating new point clouds Set D. FIG. 11 is an illustration 1100 of an example set of intersections and new points, according to some embodiments.

This would provide a set of parameter-mapped point clouds, with several examples for each representing the form of the original digital 3D CAD model, Set C, and the pre-grind cast metal parts, Set D.i, D.ii, and so on to D.n, n representing the number of 3D scans being used. That is, the various point clouds would be the same point cloud, except for the differences in the positions of each of the points between sets representing the cumulative errors in the pre-grind cast metal parts. (see Table 1).

TABLE 1

| Point Cloud Set C | Point Cloud Set D.i | Point Cloud Set D.ii | Point Cloud Set D.n |
|---|---|---|---|
| <Parameter 1> | <Parameter 1> | <Parameter 1> | <Parameter 1> |
| <Parameter 2> | <Parameter 2> | <Parameter 2> | <Parameter 2> |
| <Parameter 3> | <Parameter 3> | <Parameter 3> | <Parameter 3> |
| . . . | . . . | . . . | . . . |

Each data Set D including point cloud set scanned from the pre-grind cast metal parts, Sets D.i, D.ii to D.n, may include:
- X, Y, Z spatial data points for each individual point in the point cloud
- Any additional information from the scan including:
  - Visual/colour data
  - Material properties of metal as possible by scanning methods, for illustrative example crystal grain sizes via pulsed laser ultrasound, or other methods
  - Temperature measurements captured during casting process
  - Humidity measurements captured during casting process
  - Any lot-specific information such as details of:
    - Casting sand type used
    - Binder types and release agents used
    - Specific lot number or other tracking number
    - Date, time, and location of sand-cast part creation The reference data Set C would include ideal representative data for all variable metadata such as temperature and humidity of the metal casting environment in which the metal parts were manufactured.

Figure 12:
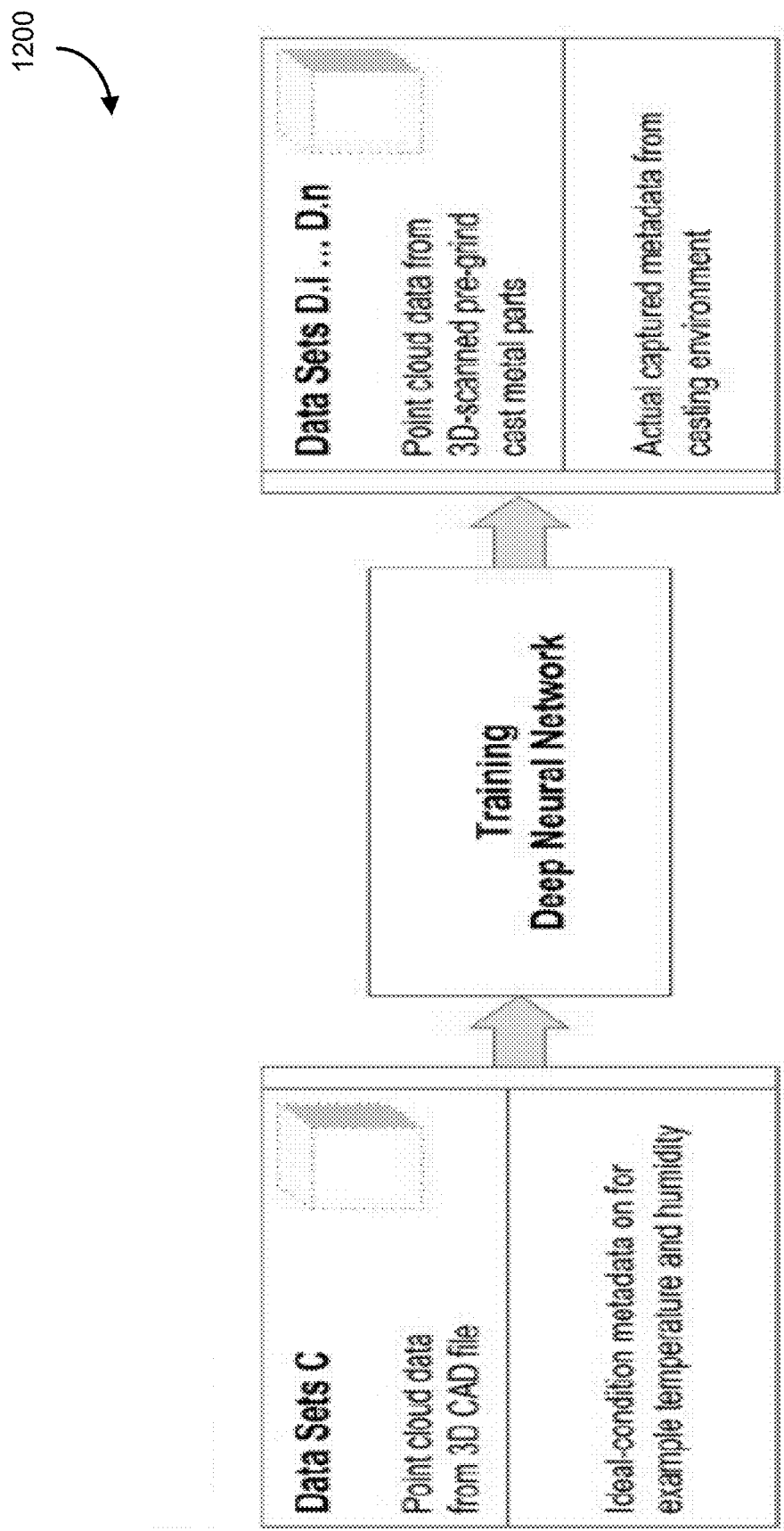
FIG. 12 is an example method for training the deep neural network, according to some embodiments.

A deep neural net process (deep learning) would be applied between these data sets to learn the function of transforming point cloud Set C (from 3D CAD file) consistently into point cloud Sets D.i, D.ii to D.n (from pre-grind cast metal parts). FIG. 12 is an example method 1200 for training the deep neural network, according to some embodiments.

There are a very complex set of interactions suitable for deep learning. An inference process (e.g. coded instructions for configuring computing elements, instructions stored on computer readable media) can be generated from training the deep neural net. This trained inference process would then be used (e.g., back propagated, run in reverse) on the parameter-mapped point cloud of the original digital 3D CAD file, Data Set C, to output Data Set E, being point cloud data for a modified wood pattern.

Figure 13:
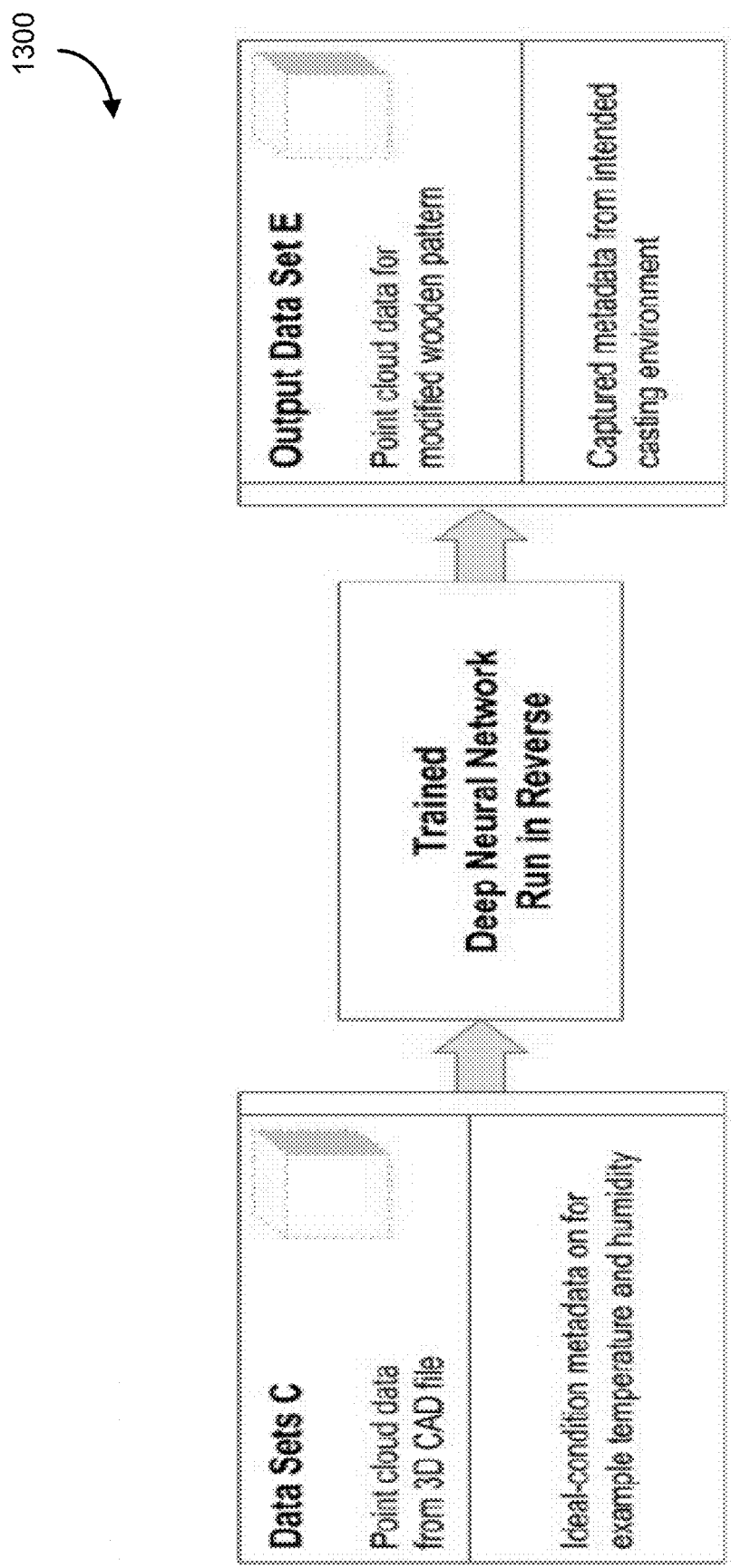
FIG. 13 is an example method for modifying a wood pattern, according to some embodiments.

FIG. 13 is an example method 1300 for modifying a wood pattern, according to some embodiments. Ideal metadata such as ideal casting environment temperature and humidity would be replaced with expected metadata such as known temperature and humidity of the intended casting location.

The resulting modified point cloud would essentially have the learned transformations applied in negative. That is, in places where there is extra volume and material on the sand cast part (data Set D), there would be proportionally reduced volume on the outputted point cloud (or other digital 3D representation) in data Set E, intended as the basis for a modified wood pattern.

Figure 14:
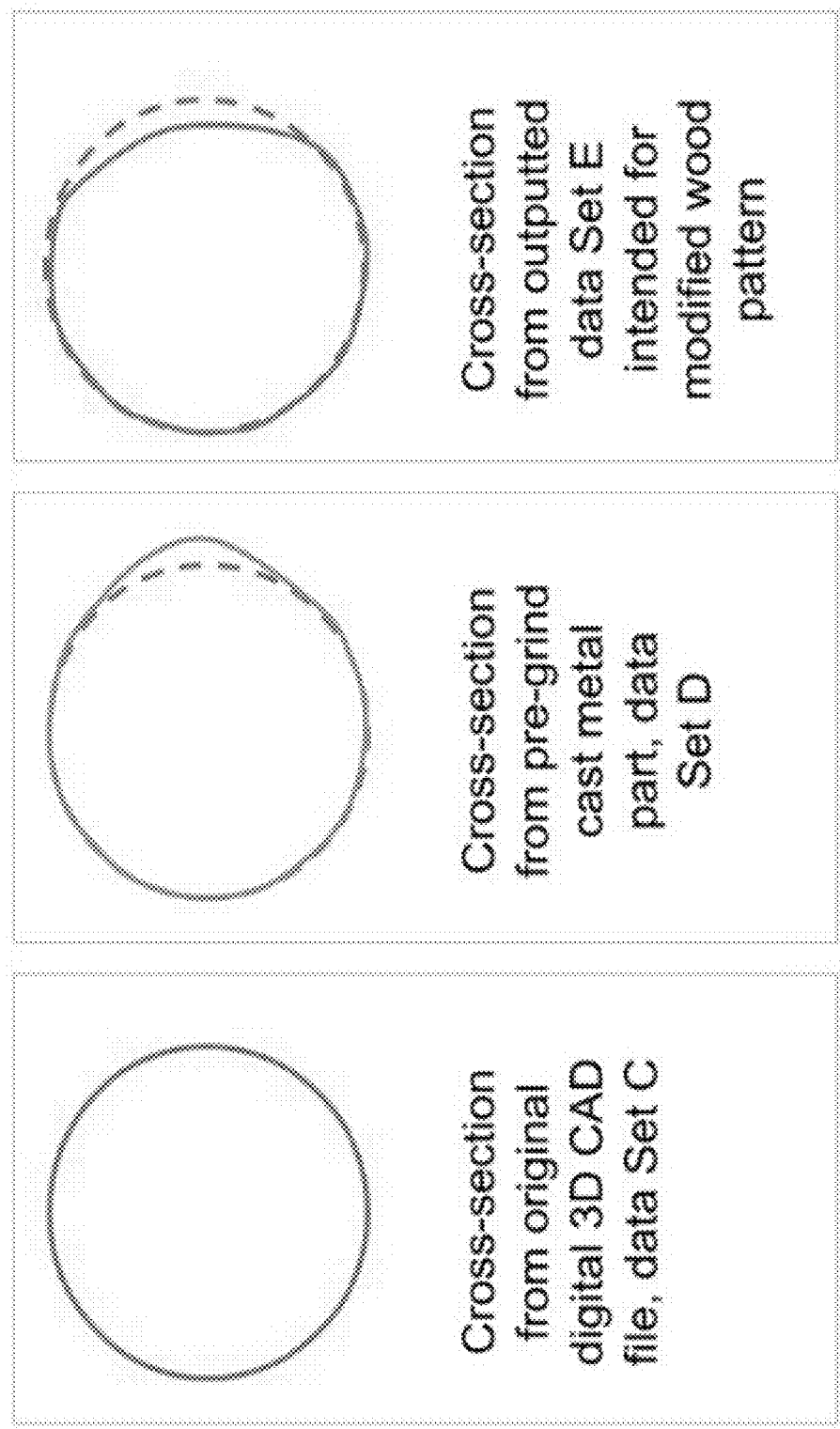
FIG. 14 is an illustration of an example modified wood pattern, according to some embodiments.

FIG. 14 is an illustration 1400 of an example modified wood pattern, according to some embodiments. This would not be a linear difference, as the suitable amount would be learned from the data.

The outputted point cloud or other 3D digital representation, data Set E including point cloud set E, would then be outputted by CNC milling or other method as a new wood pattern (or as 3D printed pattern or other method).

Figure 15:
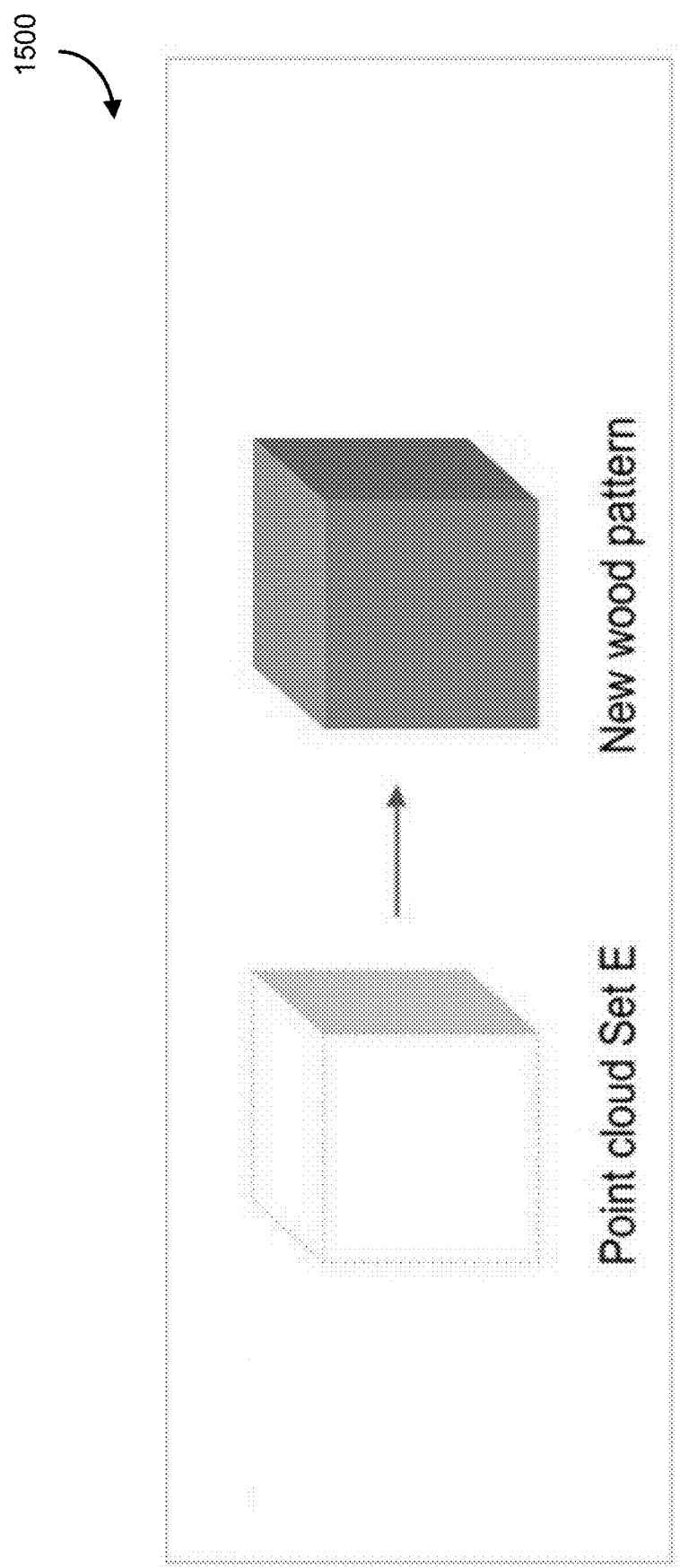
FIG. 15 is an illustration showing a mapping of Set E to a new wood pattern, according to some embodiments.

FIG. 15 is an illustration 1500 showing a mapping of Set E to a new wood pattern, according to some embodiments.

This new wood pattern based on point cloud Set E would be used as the basis for creating new sand cast cavities, into which molten metal would be poured to create a new cast metal part.

Figure 16:
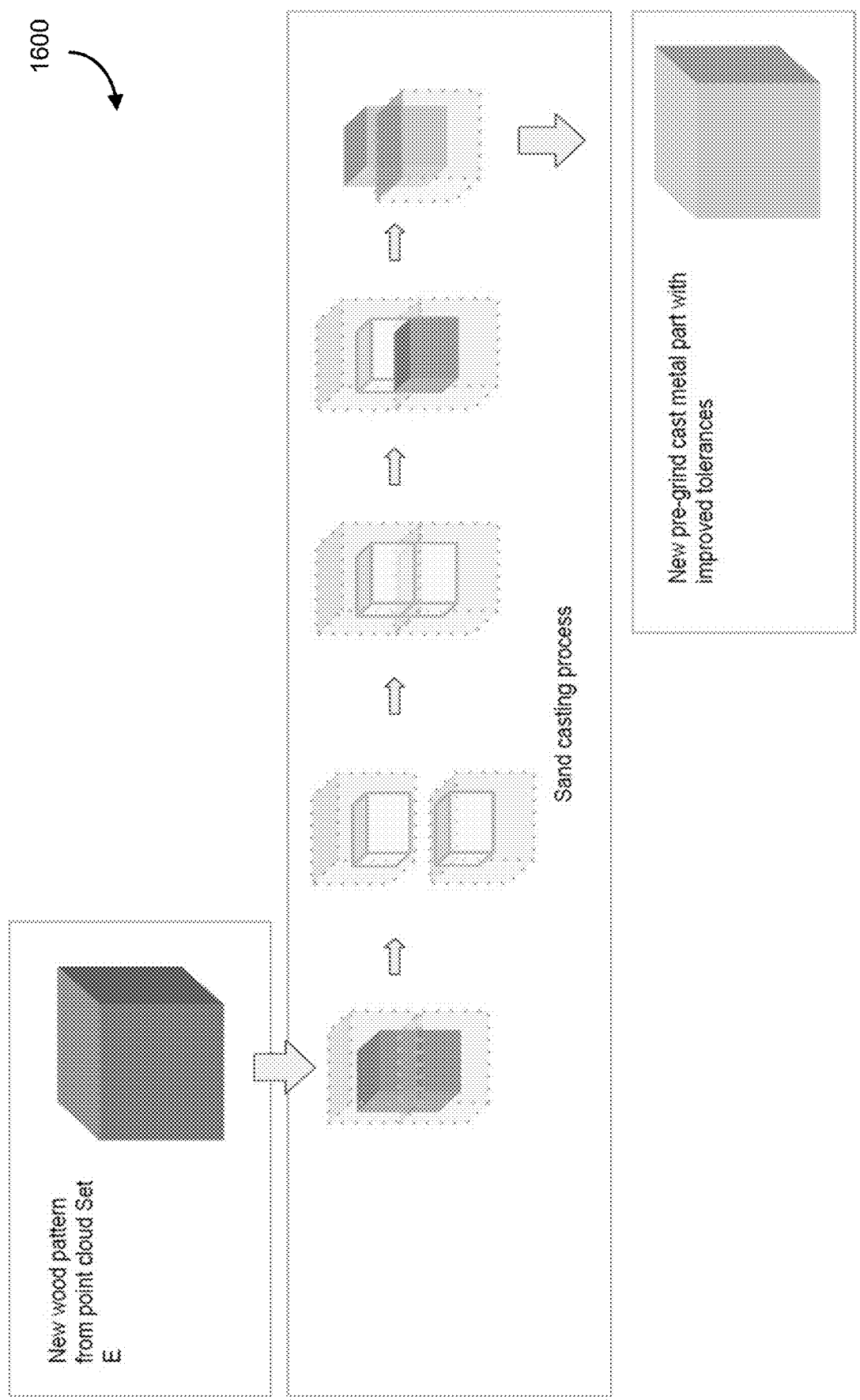
FIG. 16 is an illustration of an improved sand casting process using the new wood pattern, according to some embodiments.

FIG. 16 is an illustration 1600 of an improved sand casting process using the new wood pattern, according to some embodiments.

The new pre-grind cast metal part would come out much closer to the intended part as represented by the original digital 3D CAD file, as the interactions causing deformation and loss of fidelity would now be accounted for through the deep learning adjustment.

FIG. 17 is an illustration 1700 of an improved actual cast part having improved tolerances using the modified wood pattern, according to some embodiments.

Figure 18:
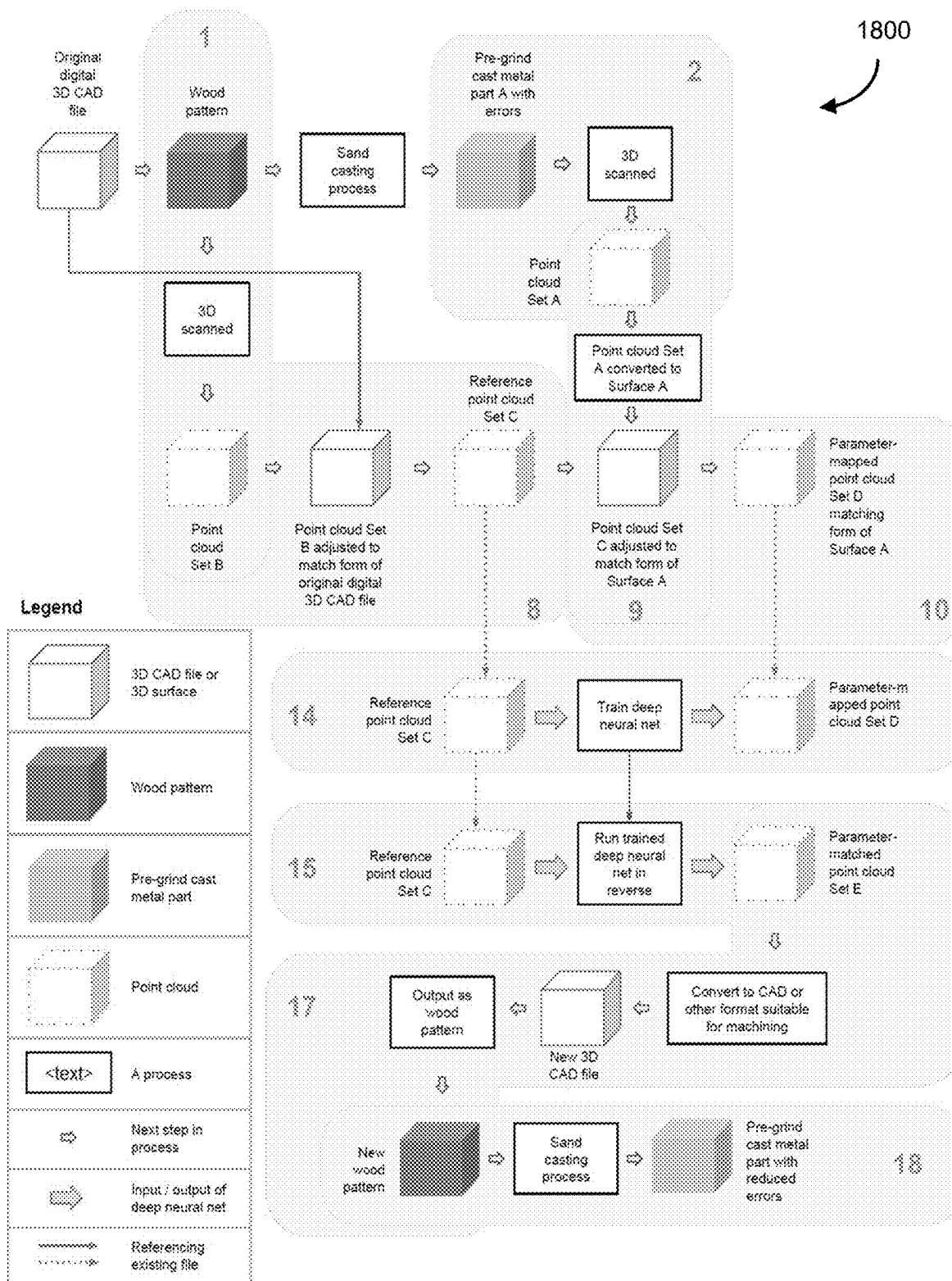
FIG. 18 is an example method diagram showing an end-to-end process for one particular cast metal part type, according to some embodiments.

FIG. 18 is an example method diagram 1800 showing an end-to-end process for one particular cast metal part type, according to some embodiments. As noted, the approach is not limited to point cloud data and other digital formats suitable for applied deep learning are contemplated.

FIG. 18 illustrates the process with a focus on and the details relevant to the use and adjustment of point clouds as the 3D digital representation of the scans. As noted, the approach is not limited to the use of point clouds, but rather to the conversion of the scanned 3D data to any digital format that is suitable for applied deep learning. This includes but is not limited to:
- Point clouds
- Triangular meshes
- Voxels
- Parametric surface such as NURBS, among others.

Figure 19:
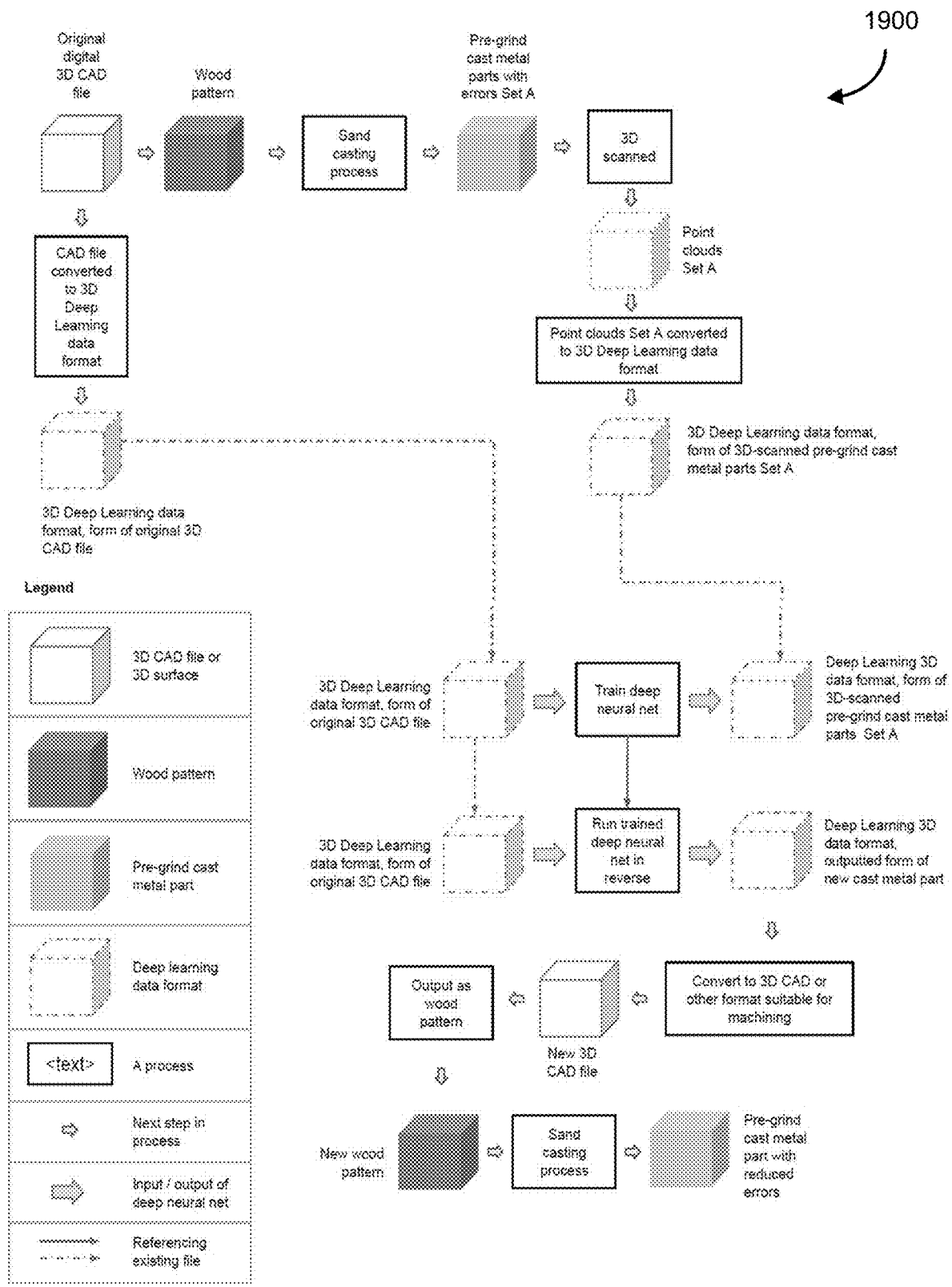
FIG. 19 is a process diagram of the process agnostic of the particular digital format, labelled as "3D Deep Learning data format", according to some embodiments.

FIG. 19 is a process diagram 1900 of the process agnostic of the particular digital format, labelled as "3D Deep Learning data format", according to some embodiments.

This process can initially be run on one specific type of part at a time. Thereafter, additional parts would be added to the training set, such that many different types of input and output parts were considered, generalizing the function learned in this process. A generalized function, if proven to be sufficiently robust, could then be applied to any new part without the requirement of the 3D scanning process.

Figure 20:
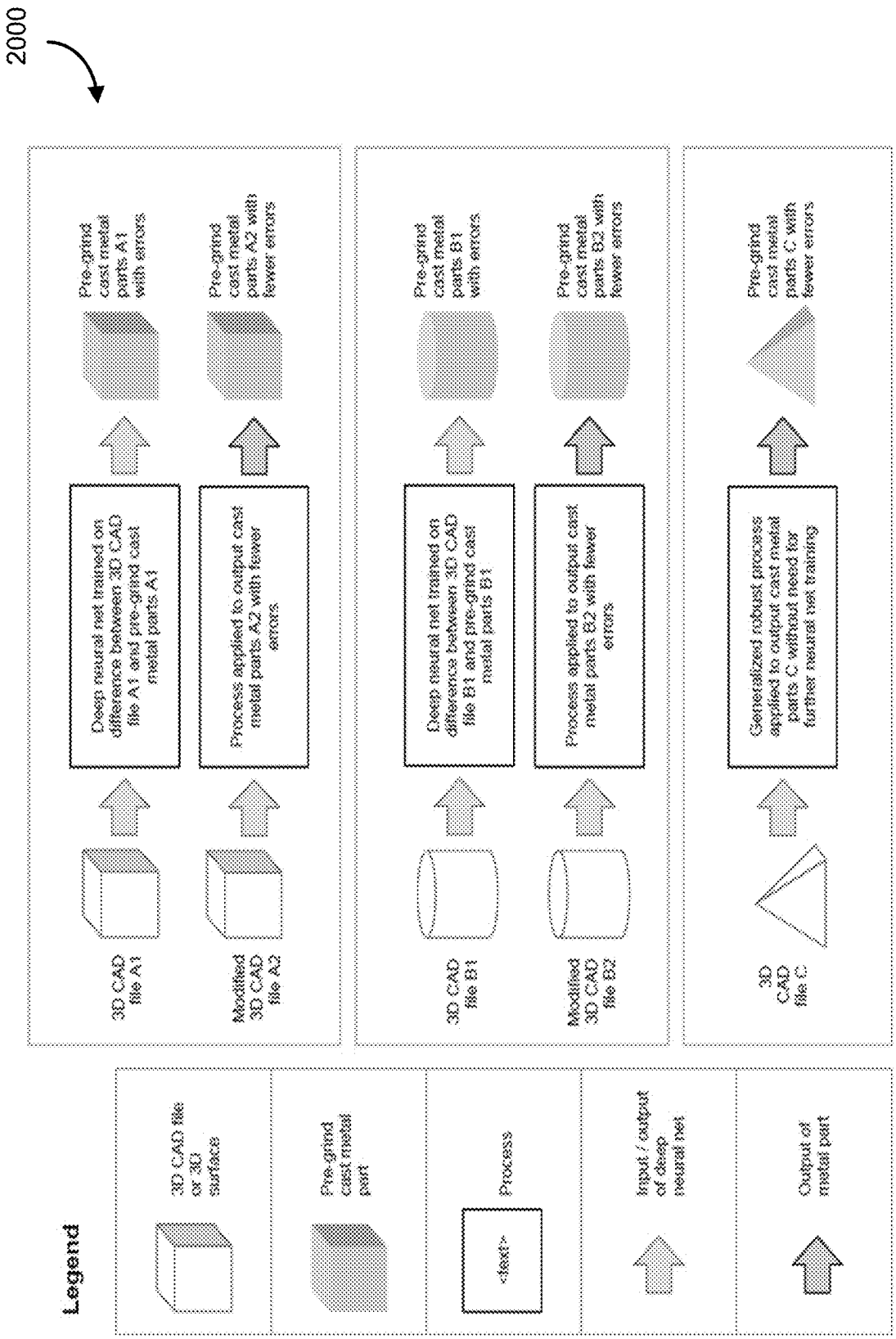
FIG. 20 is a diagram illustrating a process whereby the neural network is sufficiently trained and used to cast parts without further neural network training, according to some embodiments.

FIG. 20 is a diagram 2000 illustrating a process whereby the neural network is sufficiently trained and used to cast parts without further neural network training, according to some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for casting physical parts from a 3D CAD model, the system comprising a computer processor configured to:
   receive data sets representative of 3D points relating to a 3D CAD model for an ideal part;
   receive data sets representative of 3D points relating to a cast mold or cast physical parts;
   receive data sets representative of 3D points relating to a cast mold and the cast physical parts; and
   provide a neural network training engine configured for tracking relationships between features of between the 3D points relating to the cast mold and the cast physical parts and the 3D points relating to the 3D CAD model for the ideal part, the relationships maintained on a neural network stored on data storage having one or more interconnected computing nodes having weighted interconnections which represent a transfer function between inputs and output, the weighted interconnections trained periodically using a neural network training set;
   wherein 3D digital representations of the 3D points of the 3D CAD model, cast mold, and cast physical parts, or two of them, or all three, are established through point cloud sets such that the reference 3D digital representation is a reference point cloud set and the 3D digital representation of the physical parts is a point cloud set of the physical parts;
   wherein the reference point cloud set is generated by:
      3D scanning a prototype part representative of the ideal part to create a point cloud set representation of the prototype part;
      extending projections from each point in the point cloud set representation of the prototype part that are perpendicular to the surface of the 3D CAD model, wherein the reference point cloud set includes points where the extending projections intersect with the surface of the object represented in the 3D CAD model; and
   wherein the neural network training set is generated by:
      3D scanning the surface of the physical parts to create a point cloud set representation;
      converting the point cloud set representation into a projected 3D surface of each physical part; and
      extending projections from each point in the reference point cloud set that are perpendicular with the surface of the CAD model, wherein the neural network training set comprises of the points where the projection intersects with the projected 3D surface of each physical part.

2. The system of claim 1, wherein the casting is sand casting.

3. The system of claim 1, wherein the computer processor is configured to modify manufacturing process parameters using the trained neural network.

4. The system of claim 3, wherein the
   manufacturing process parameters include controllable environmental factors controlling an environment of a manufacturing facility.

5. The system of claim 4, wherein the
   manufacturing process parameters are controlled through machine interpretable instruction sets indicative of at least one of desired temperatures or humidity.

6. The system of claim 5, wherein the converting of the point cloud set representation of each physical part into the corresponding projected 3D surface of the physical part utilizes a non-uniform rational b-spline.

7. The system of claim 6, wherein the training of the neural network includes aspects in a feature set other than the 3D spatial data, the training further comprising:
appending at least one metadata quantity representing the ideal conditions the casting process is to be run at onto the reference point cloud representation;
recording metadata corresponding with the quantities appended to the reference point cloud representation and appending the metadata to point cloud representations in the training data set.

8. The system of claim 7, wherein the characteristics other than the 3D spatial data include least one of humidity or temperature.

9. The system of claim 1, wherein the neural network is a deep neural net inference process of instructions stored on computer readable media.

10. The system of claim 1, wherein the 3D digital representation form is triangulated meshes, voxels, or NURBS surfaces.

11. A method for casting physical parts from a 3D CAD model, the method comprising:
manufacturing a prototype part from the 3D CAD model;
creating a cast mold from the prototype part;
creating a reference 3D digital representation from the 3D CAD model;
casting a plurality of cast physical parts from the cast mold;
generating a neural network training data set by creating 3D digital representations of the physical parts;
training a neural network by comparing the reference 3D digital representation with the neural network training data set, the neural network tracking relationships between features of between 3D points relating to the cast mold and the cast physical parts and the 3D points relating to the 3D CAD model for the reference 3D digital representation, the neural network having one or more interconnected computing nodes having weighted interconnections which represent a transfer function between inputs and output, the weighted interconnections trained periodically using the neural network training set;
running the trained neural network in reverse to create a 3D digital representation of a new prototype part to create a new cast from;
creating a new cast mold from the new prototype part; and casting physical parts from the new cast mold;
wherein the 3D digital representations of the 3D points of the 3D CAD model, cast mold, and cast physical parts, or two of them, or all three, are established through point cloud sets such that the reference 3D digital representation is a reference point cloud set and the 3D digital representation of the physical parts is a point cloud set of the physical parts; wherein the reference point cloud set is generated by:

3D scanning a prototype part representative of the ideal part to create a point cloud set representation of the prototype part;
extending projections from each point in the point cloud set representation of the prototype part that are perpendicular to the surface of the 3D CAD model, wherein the reference point cloud set includes points where the extending projections intersect with the surface of the object represented in the 3D CAD model; and
wherein the neural network training set is generated by:
3D scanning the surface of the physical parts to create a point cloud set representation;
converting the point cloud set representation into a projected 3D surface of each physical part; and
extending projections from each point in the reference point cloud set that are perpendicular with the surface of the CAD model, wherein the neural network training set comprises of the points where the projection intersects with the projected 3D surface of each physical part.

12. The method of claim 11, wherein the casting is sand casting.

13. The method of claim 11, wherein the computer processor is configured to modify manufacturing process parameters using the trained neural network.

14. The method of claim 13, wherein the manufacturing process parameters include controllable environmental factors controlling an environment of a manufacturing facility.

15. The method of claim 14, wherein the manufacturing process parameters are controlled through machine interpretable instruction sets indicative of at least one of desired temperatures or humidity.

16. The method of claim 15, wherein the converting of the point cloud set representation of the physical part into the projected 3D surface of the physical part is achieved through a non-uniform rational b-spline.

17. The method of claim 16, wherein the training of the neural network takes into consideration characteristics other than the 3D spatial data, the training further comprising:
appending at least one metadata quantity representing the ideal conditions the casting process is to be run at onto the reference point cloud representation;
recording metadata corresponding with the quantities appended to the reference point cloud representation and appending the metadata to point cloud representations in the training data set.

18. The method of claim 17, wherein the characteristics other than the 3D spatial data include least one of humidity or temperature.

19. The method of claim 11, wherein the trained neural network used is a deep neural net inference process.

20. The method of claim 11, wherein a form of the 3D digital representations includes at least one of triangulated meshes, voxels, or NURBS surfaces.

* * * * *